US012761455B2

(12) United States Patent
Chakraborty et al.

(10) Patent No.: US 12,761,455 B2
(45) Date of Patent: Oct. 13, 2026

(54) MICROSCOPE INCLUDING REMOTE FOCUSING SYSTEM

(71) Applicant: UNM RAINFOREST INNOVATIONS, Albuquerque, NM (US)

(72) Inventors: Tonmoy Chakraborty, Albuquerque, NM (US); Sayed Hassan Dibaji Foroushani, Albuquerque, NM (US)

( * ) Notice: Subject to any disclaimer, the term of this patent is extended or adjusted under 35 U.S.C. 154(b) by 155 days.

(21) Appl. No.: 18/798,274

(22) Filed: Aug. 8, 2024

(65) Prior Publication Data

US 2025/0052989 A1 Feb. 13, 2025

Related U.S. Application Data

(60) Provisional application No. 63/518,495, filed on Aug. 9, 2023.

(51) Int. Cl.
*G02B 21/00* (2006.01)
*G02B 7/08* (2021.01)

(52) U.S. Cl.
CPC ............. *G02B 21/006* (2013.01); *G02B 7/08* (2013.01); *G02B 21/0068* (2013.01)

(58) Field of Classification Search
CPC .............. G02B 21/006; G02B 21/0032; G02B 21/0068; G02B 21/367; G02B 7/08
See application file for complete search history.

(56) References Cited

U.S. PATENT DOCUMENTS 8,498,048 B2 7/2013 Wilson
9,638,909 B2 5/2017 Wilson
10,477,124 B2 11/2019 Lippert
10,746,981 B2 8/2020 Tomer
11,506,877 B2 11/2022 Tomer
11,874,450 B2 1/2024 Deissler
2012/0307250 A1* 12/2012 Wang ................. G01N 21/1717 356/450
2018/0292784 A1* 10/2018 Nguyen ............... G02B 21/365
2018/0321154 A1* 11/2018 Podgorski .......... G02B 21/0032
2021/0263295 A1* 8/2021 Fiolka .................. G02B 21/367
2022/0342196 A1 10/2022 Fahrbach

OTHER PUBLICATIONS

Dibaji et al., "Axial de-scanning using remote focusing in the detection arm of light-sheet microscopy", Nature Comm, Jun. 12, 2024;15(1):5019: 22 pgs. including Supplemental Information.

* cited by examiner

*Primary Examiner* — Jonathan Y Jung
(74) *Attorney, Agent, or Firm* — Meuting Raasch Group

(57) ABSTRACT

Various embodiments of a remote focusing system and a microscope that includes such system are disclosed. The system includes a first mirror configured to direct first and second polarized light beams from a beamsplitter to a remote objective. The first and second polarized light beams are representative of an image of a portion of a biological sample. The remote objective is configured to provide first and second polarized intermediate images of the portion of the sample based on the first and second polarized light beams to a reflective surface of a focal plane mirror. The focal plane mirror and the first and second mirrors are further configured to direct the first polarized intermediate image and the second polarized intermediate image to a detector to detect the first polarized intermediate image and the second polarized intermediate image as a final composite image.

20 Claims, 14 Drawing Sheets
(4 of 14 Drawing Sheet(s) Filed in Color)

MICROSCOPE INCLUDING REMOTE FOCUSING SYSTEM

This application claims the benefit of U.S. Provisional Application No. 63/518,495, filed Aug. 9, 2023, the disclosure of which is incorporated by reference herein in its entirety.

GOVERNMENT FUNDING

This invention was made with government support under NIH R35 GM151152, awarded by the National Institutes of Health. The government has certain rights in the invention.

BACKGROUND

Advances in fluorescence imaging technologies have the potential to transform the field of biology. It is now possible to study the real-time dynamics of labelled proteins with single particle tracking (SPT) and to map the organization of proteins at the nanometer scale resolution using super-resolution (SR) imaging. Light Sheet Fluorescence Microscopy (LSFM) allows high-resolution, volumetric imaging that can capture fast dynamics in three dimensions and image complex networks of cell types at the millimeter to centimeter scale in live and cleared tissue.

Being able to change focus dynamically has advantages in imaging of biological samples. In microscopy this is particularly advantageous since it offers the potential to bypass sample or objective scanning, which are by far the two most popular methods to carry out 3D volumetric imaging. This is because to obtain images at different planes it is necessary to move the sample relative to the fixed focal plane of the detection objective, which is kept "locked" with the plane of the light sheet. While these approaches have been commonplace in tissue imaging, exotic emerging protocols in tissue-clearing, like expansion microscopy, leave samples so delicate and soft that sample scanning results in vibration artifacts. These protocols also pose enormous hurdles while imaging live specimens like a young Zebrafish embedded in molted agarose or cells on coverslips that drift significantly as the sample stage is scanned. Further, scanning samples is often cumbersome and slow, which essentially reduces the volumetric scan speed.

Alternately, another way to address this problem is by keeping the sample fixed in space and moving the light sheet through the sample to perform optical sectioning. This approach, however, requires that an orthogonally placed detection objective needs to be synchronized and repositioned with the moving light sheet.

Several attempts have been carried out to mitigate this problem. For example, a motorized stage attached to the detection objective has been employed to perform rapid back-and-forth motion to keep the light sheet in the focal plane. This method, however, requires moving optical parts through the media. Also, the time required to manipulate the detection objective reduces volumetric imaging to only a few volumes per second. In another attempt, the rapid refocusing operation was carried out using an Electrically Tunable Lens (ETL), which increases scanning speed but reduces image quality. Another approach uses remote focusing on a detection arm of a light sheet microscope that splits light emitted by a sample into two polarizations. Such approach, however, only utilizes one of the polarizations, thereby sacrificing half of the fluorescent signal.

SUMMARY

In general, the present disclosure provides various embodiments of a remote focusing system and a microscope that includes the remote focusing system. Such remote focusing system can be configured to de-scan axial focus movement in a detection arm of the microscope. When attached to an existing microscope, the remote focusing system can allow a user to alter axial focus of a biological sample without moving the sample or the detection objective. Further the system can be configured to split a fluorescence signal emitted by a biological sample into polarized light beams having different polarizations, e.g., a first polarized light beam having an S-polarization and a second polarized light beam having a P-polarization. Such polarized light can pass through the remote focusing system separately and then be combined at a detection surface of a detector. By splitting the emitted light into two polarizations, a single remote objective can be utilized to perform aberration-free, multi-color, volumetric imaging without (a) compromising the fluorescent signal, or (b) performing sample/detection-objective translation. One or more embodiments of remote focusing systems described herein can be utilized with any suitable microscopy techniques that include an adjustable Z-stage to carry out volumetric imaging, e.g., confocal, 2-photon, and light sheet microscopy systems.

In one aspect, the present disclosure provides a remote focusing system that includes a polarizing beam splitter configured to split an unpolarized light beam that is incident upon the beam splitter into a first polarized light beam having a first polarization and a second polarized light beam having a second polarization, where the first polarization is different from the second polarization, and further where the unpolarized light beam is representative of an image of a portion of a biological sample. The system further includes a remote objective configured to focus the first polarized light beam and the second polarized light beam onto a focal plane, a first mirror configured to direct the first polarized light beam to the remote objective, and a second mirror configured to direct the second polarized light beam to the remote objective. The system further includes a focal plane mirror disposed at the focal plane of the remote objective and along an optical axis that extends orthogonally from a reflective surface of the focal plane mirror to the polarizing beam splitter, where the remote objective is further configured to provide a first polarized intermediate image of the portion of the sample based on the first polarized light beam on the reflective surface and a second polarized intermediate image of the portion of the sample based on the second polarized light beam on the reflective surface. The focal plane mirror is configured to direct a third polarized light beam having a third polarization and representative of the first polarized intermediate image to the first mirror and a fourth polarized light beam including a fourth polarization and representative of the second polarized intermediate image to the second mirror, where the third polarization is different from the fourth polarization. The first mirror is further configured to direct the third polarized light beam through the polarizing beam splitter to a detection surface of a detector, and the second mirror is further configured to direct the fourth polarized light beam through the polarizing beam splitter to the detection surface of the detector. Further, the detector is configured to detect the first polarized intermediate image and the second polarized intermediate image as a final composite image.

In another aspect, the present disclosure provides a microscope that includes an illumination arm aligned along an illumination axis. The illumination arm includes a light source configured to provide a light sheet that is projected through a biological sample, and an illumination objective configured to receive the light sheet from the light source and focus the light sheet through the sample. The microscope further includes a detection arm including a detection objective having an optical axis that is orthogonal to the illumination axis, where the detection objective is configured to receive light emitted by a portion of the sample that is illuminated with the light sheet and form an unpolarized light beam that is representative of an image of the portion of the sample. The detection arm further includes a remote focusing system that includes a polarizing beam splitter configured to split the unpolarized light beam that is incident upon the beam splitter from the detection objective into a first polarized light beam having a first polarization and a second polarized light beam having a second polarization, where the first polarization is different from the second polarization. The detection arm further includes a remote objective configured to focus the first polarized light beam and the second polarized light beam onto a focal plane, a first mirror configured to direct the first polarized light beam to the remote objective, a second mirror configured to direct the second polarized light beam to the remote objective, and a focal plane mirror disposed at the focal plane of the remote objective and along an optical axis that extends orthogonally from a reflective surface of the mirror to the polarizing beam splitter. The remote objective is further configured to provide a first polarized intermediate image of the portion of the sample based on the first polarized light beam on the reflective surface and a second polarized intermediate image of the portion of the sample based on the second polarized light beam on the reflective surface. The focal plane mirror is configured to direct a third polarized light beam having a third polarization and representative of the first polarized intermediate image to the first mirror and a fourth polarized light beam having a fourth polarization and representative of the second polarized intermediate image to the second mirror, where the third polarization is different from the fourth polarization. The first mirror is further configured to direct the third polarized light beam through the polarizing beam splitter to a detection surface of a detector, and the second mirror is further configured to direct the fourth polarized light beam through the polarizing beam splitter to the detection surface of the detector. The detector is configured to detect the first polarized intermediate image and the second polarized intermediate image as a final composite image.

In another aspect, the present disclosure provides a method that includes splitting an unpolarized light beam that is incident upon a beam splitter into a first polarized light beam including a first polarization and a second polarized light beam including a second polarization, where the first polarization is different from the second polarization, and further where the unpolarized light beam is representative of an image of a portion of a biological sample. The method further includes directing the first polarized light beam to a remote objective utilizing a first mirror, directing the second polarized light beam to the remote objective utilizing a second mirror, and focusing the first polarized light beam to a reflective surface of a focal plane mirror utilizing the remote objective to provide a first polarized intermediate image of the portion of the sample. The method further includes focusing the second polarized light beam to the reflective surface of the focal plane mirror utilizing the remote objective to provide a second polarized intermediate image of the portion of the sample, directing a third polarized light beam including a third polarization and representative of the first polarized intermediate image to the first mirror utilizing the focal plane mirror, and directing a fourth polarized light beam having a fourth polarization and representative of the second polarized intermediate image to the second mirror utilizing the focal plane mirror, where the third polarization is different from the fourth polarization. The method further includes directing the third polarized light beam through the polarizing beam splitter to a detection surface of a detector utilizing the first mirror, directing the fourth polarized light beam through the polarizing beam splitter to the detection surface of the detector utilizing the second mirror, and detecting a final composite image of the portion of the biological sample utilizing the detector. The final composite image includes the first and second polarized intermediate images.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. The term "consisting of" means "including," and is limited to whatever follows the phrase "consisting of." Thus, the phrase "consisting of" indicates that the listed elements are required or mandatory and that no other elements may be present. The term "consisting essentially of" means including any elements listed after the phrase and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful and is not intended to exclude other embodiments from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The patent or application file contains at least one drawing or photograph executed in color. Copies of this patent or patent application publication with color drawing(s) or photographs(s) will be provided by the Office upon request and payment of the necessary fee.

Throughout the specification, reference is made to the appended drawings, where like reference numerals designate like elements, and wherein.

DETAILED DESCRIPTION

Figure 1:
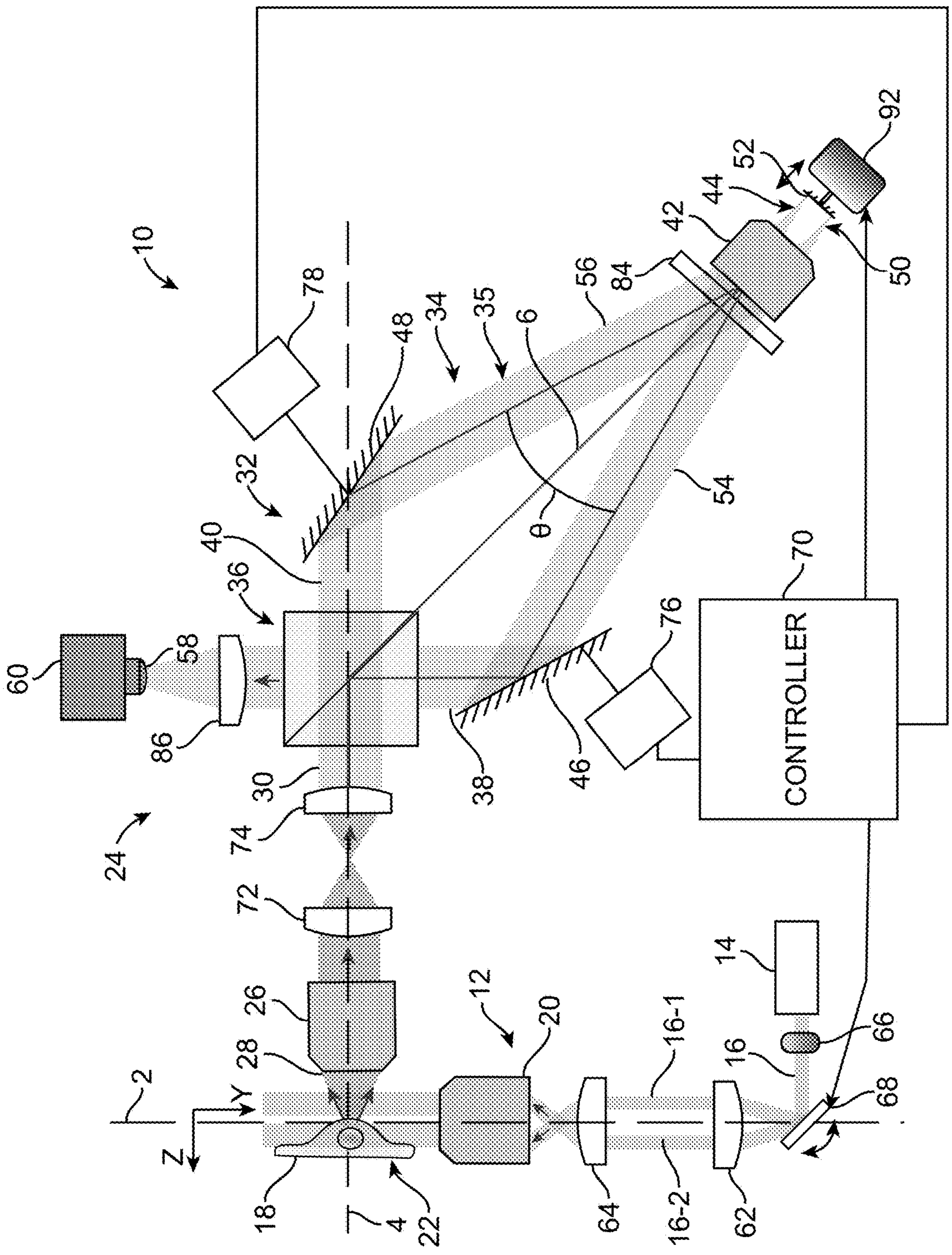
FIG. 1 is a schematic plan view of one embodiment of a microscope that includes a remote focusing system.

In general, the present disclosure provides various embodiments of a remote focusing system and a microscope that includes the remote focusing system. Such remote focusing system can be configured to de-scan axial focus movement in a detection arm of the microscope. When attached to an existing microscope, the remote focusing system can allow a user to alter axial focus of a biological sample without moving the sample or the detection objective. Further the system can be configured to split a fluorescence signal emitted by a biological sample into polarized light beams having different polarizations, e.g., a first polarized light beam having an S-polarization and a second polarized light beam having a P-polarization. Such polarized light can pass through the remote focusing system separately and then be combined at a detection surface of a detector. By splitting the emitted light into two polarizations, a single remote objective can be utilized to perform aberration-free, multi-color, volumetric imaging without (a) compromising the fluorescent signal, or (b) performing sample/detection-objective translation. One or more embodiments of remote focusing systems described herein can be utilized with any suitable microscopy techniques that include an adjustable Z-stage to carry out volumetric imaging, e.g., confocal, 2-photon, and light sheet microscopy systems.

Fast 3D positioning or scanning of an optical system's focal point or focal plane has the potential to transform many areas of biophotonics, especially those that require studying the complex dynamics of living organisms. Processes like investigation of neuronal activities of the brain, blood flow in the heart, and cell signaling require high-speed volumetric imaging. Such volumetric imaging, however, requires an axial scan either through the translation of the sample or the detection objective lens. These axial translations result in imaging modalities that are often slow, with speeds limited to a few hundred Hz. Additionally, with fragile samples, such as an expanded sample in hydrogel, fast movements of the sample stage may agitate the sample and induce distortions when collecting volumetric images. To avoid the slow translation of bulky objectives or the sample stages, several attempts, employing variable-focus (vari-focus) lenses, mechanical mirrors, and acousto-optic modulators, have been proposed to refocus the light for 3D imaging. These attempts, however, suffer from unacceptable aberrations introduced by the focusing elements. A large category of those techniques utilizes different types of tunable lenses such as ferroelectric liquid crystal (LC), acoustic waves (TAG lens), and acoustic optics modulators (AOM) to achieve fast focal shifts (~1 kHz). Ferroelectric LC and TAG lenses introduce a focal shift by varying the gradient of the refractive index of the liquid medium; however, the generated phase variation only approximates the defocus phase, leading to increased spherical aberration at large focal shifts. AOM-based vari-focus techniques, on the other hand, use two AOMs with counterpropagating acoustic waves to cancel out the transverse scan but can only achieve focus shift in one dimension (acting as a cylindrical lens).

Adaptive optics-based vari-focus techniques overcome these limitations through accurate wavefront control using either a spatial light modulator (SLM) or a deformable mirror (DM), thereby achieving a response rate of ~1 kHz and 20 kHz respectively. SLMs, however, are polarization and wavelength-dependent and cannot model a continuous wavefront of the defocus phase due to its limited phase modulation depth. Large phase shifts are generated through multiple phase-wrapping of $2\pi$. With finite fly-back at the phase-wrapping borders, part of the incident light is not correctly modulated and results in decreased intensity at the focus. Further, DMs are not polarization and wavelength-dependent and can model a continuous defocus wavefront. The axial scan range of a DM, however, is limited by the stroke length of the DM actuators. For example, for an objective with a numerical aperture (NA) of 0.8, the maximum axial scan range that DM-based techniques can generate is ~100 μm. Further, using a DM for focus control requires accurate alignment and complicated calibration of the DM to reduce the aberrations caused by imaging samples out of the nominal focal plane of the objective.

Unlike the adaptive optics or DM-based approaches that require correcting the defocus plane-by-plane, pupil-matched remote focusing (pmRF) instantaneously corrects defocus across 3D volumes for high-NA optics, thereby conserving the microscope's temporal bandwidth. In addition, because pmRF allows precise mapping of the wavefront coupled into the back pupil of the objective, where the angular magnification is unity, such techniques have been routinely used to carry out aberration-free, high-quality axial focus control. In pmRF techniques, a fast axial scan is achieved by the translation of a small mirror in front of the remote objective using a focus actuator or by a lateral scan of a galvo mirror in combination with a step or tilted mirror at the remote objective. Because of the fast response time of the focus actuator or the galvo mirror, an axial scan rate of 1-5 kHz or 12 kHz can be achieved respectively. Current pmRF techniques for focus control are, however, primarily limited to the illumination path. This is because pmRF uses the concept of optical isolators, where the polarization of the returning beam is rotated orthogonally to the incoming beam so that it can be separated from the incoming beam at the polarizing beam splitter (PBS). This configuration ensures minimum light loss through the pmRF module but requires that the incoming beam be polarized, which is why this method is primarily used in the illumination arm where illumination laser light is typically polarized in nature, and its manipulation through the optical isolator can be easily done. In the detection arm, however, due to the fluorescence anisotropy, the emitted fluorescence may be partially polarized in nature. Because pmRF typically utilizes purely linear optical elements (like lenses, PBSs, mirrors, waveplates, etc.), lossless conversion of unpolarized light into either an S- or P-polarization state is not yet possible. Achieving 100% efficiency in transmitting fluorescent light in and out through an optical isolator, which is used in folded pmRF geometry, is not, therefore, feasible. As a result, microscopes that use an optical isolator based pmRF to carry out axial scanning may incur up to 50% light loss due to one state of the polarized light being discarded after the PBS. Some currently-available pmRF systems do utilize a 3rd objective that can collect the entire fluorescence signal; however, this design requires translation of bulky objectives that slow down the axial scan speed.

A straightforward method to mitigate this problem is to have another copy of the pmRF module at the unused port of the PBS to collect the other half of the fluorescent light. This approach would, however, require precise synchronization of two linear focus actuators (LFA), which is not only a difficult task at high speeds but also expensive since this method requires two such LFAs.

One or more embodiments of remote focusing systems and microscopes that utilize such systems described herein provide various advantages over currently available systems. For example, one or more embodiments of remote focusing systems include an optical design that overcomes these problems and presents a modular setup that can perform remote focusing on a detection arm of a fluorescent microscope without incurring polarization-induced losses. When attached to a light-sheet microscope, this system can allow optical refocusing without requiring the movement of the sample or the detection objective. As a result, a microscope that incorporates such remote focusing system can acquire 3D volumetric data limited only by detector speed. One or more embodiments of remote focusing systems can also be wavelength-independent, which makes such systems suitable for simultaneous multicolor imaging. Additionally, unlike SLMs that depend on polarization, the remote focusing system does not depend upon the polarization of the emitted fluorescent light.

Although recent advancements in oblique plane microscopy (OPM), which incorporates the benefits of LSMs to the convenience of single-objective microscopes, have improved scanning speeds, one or more embodiments of remote focusing systems described herein exhibit various advantages over such OPMs. For example, in such OPM systems, the de-scanning of the returning fluorescent light leads to skewed images. Before these images can be viewed, they require intensive de-skewing processes. On the other hand, one or more embodiments of systems described herein can capture 3D volumes in a conventional orthogonal setup. This can be achieved by recording high-speed images while sweeping the light sheet through the sample. Each frame captured by the detector represents an optical cross-section of the specimen. As a result, the 3D image stacks generated using the systems described herein can be immediately available for viewing. While use of optional deconvolution of the captured images can improve quality, such post-processing may not be required before viewing the images. Further, many OPM setups employ a third objective that can require expensive objectives. One or more systems described herein do not, however, require such third objectives as a secondary objective performs the role of a tertiary objective.

The various embodiments of remote focusing systems described herein can be utilized with any suitable adjustable Z-stage microscopes to carry out volumetric imaging, e.g., confocal, 2-photon, and light sheet microscopes.

In general, one or more embodiments of remote focusing systems described herein can be disposed along a detection path of a light-sheet microscope. Such system improves upon previous systems that utilize the pmRF technique by preventing the loss of 50% of the emitted fluorescence in the detection path. In one or more embodiments, fluorescent light emitted by a biological sample can be split into two polarized light beams, where the first beam has a first polarization and the second beam has a second polarization (e.g., S- and P-polarizations) to carry out remote focusing. The two remotely-focused polarized light beams can be combined at a detection surface of a detector, thereby achieving minimum light loss. A light sheet microscope including such remote focusing system can include two orthogonally arranged objectives. In one or more embodiments, the microscope can perform simultaneous two-color imaging, e.g., at 8.3 volumes (80×15×40 μm^3 in XYZ) per second with a lateral resolution, e.g., of 394 nanometers and an axial resolution, e.g., of 650 nanometers (after deconvolution).

The two polarized light beams can be directed at an oblique angle into a remote objective. This angled approach creates two separate, polarized images at a remote mirror that can be attached to an LFA. To reduce image separation, the remote objective can be positioned further from the PBS to reduce the incident angles of the polarized light beams.

FIG. 1 is a schematic plan view of one embodiment of a microscope 10. The microscope 10 includes an illumination arm 12 aligned along an illumination axis 2. The illumination arm 12 includes a light source 14 configured to provide a light sheet 16 that is projected through a biological sample 18, and an illumination objective 20 configured to receive light from the light source and focus the light sheet through the sample. The microscope 10 also includes a detection arm 24 that includes a detection objective 26 having an optical axis 4 that is orthogonal to the illumination axis 2, where the detection objective is configured to receive light 28 emitted by a portion 22 of the sample 18 that is illuminated with the light sheet 16 and form an unpolarized light beam 30 that is representative of an image 19 (FIG. 2) of the portion of the sample. The detection arm 24 further includes a remote focusing system 34 that includes a polarizing beam splitter 36 configured to split the unpolarized light beam 30 that is incident upon the beam splitter from the detection objective 26 into a first polarized light beam 38 that includes a first polarization and a second polarized beam 40 that includes a second polarization. The first polarization is different from the second polarization.

The remote focusing system 34 further includes a remote objective 42 configured to focus the first polarized light beam 38 and the second polarized light beam 40 onto a focal plane 44. A first mirror 46 of the system 34 is configured to direct the first polarized light beam 40 to the remote objective 42, a second mirror 48 is configured to direct the second polarized light beam 40 to the remote objective, and a focal plane mirror 50 is disposed at the focal plane 44 of the remote objective and along an optical axis 6 that extends orthogonally from a reflective surface 52 of the mirror to the polarizing beam splitter 36. The remote objective 42 is further configured to provide a first polarized intermediate image 80 (FIG. 2) of the portion 22 of the sample 18 based on the first polarized light beam 38 on the reflective surface 52 and a second polarized intermediate image 82 (FIG. 2) of the portion of the sample based on the second polarized light beam 40 on the reflective surface. The focal plane mirror 50 is configured to direct a third polarized light beam 54 including a third polarization and representative of the first polarized intermediate image 80 to the first mirror 46 and a fourth polarized light beam 56 including a fourth polarization and representative of the second polarized intermediate image 82 to the second mirror 48. The third polarization is different from the fourth polarization. The first mirror 46 is further configured to direct the third polarized light beam 54 through the polarizing beam splitter 36 to a detection surface 58 of a detector 60, and the second mirror 48 is further configured to direct the fourth polarized light beam 56 through the polarizing beam splitter to the detection surface of the detector. The detector 60 is configured to detect the first polarized intermediate image 80 and the second polarized intermediate image 82 as a final composite image 88.

The illumination arm 12 of the microscope 10 can include any suitable elements or components that are configured to provide illumination light to the biological sample 18. For example, the light source 14 of the illumination arm 12 can include any suitable light source or sources that provide any suitable illumination light, e.g., one or more lasers. The illumination light can be provided in any form, e.g., as a light sheet 16. For example, lens 66 can be utilized to form a light sheet 16 from illumination light emitted by the light source 14. In one or more embodiments, the light source 14 can include one or more lasers each generating illumination light having any suitable wavelength or range of wavelengths (i.e., a wavelength band). Each laser of the light source 14 can include any suitable laser. In one or more embodiments, the light source 14 can include a laser configured to provide a 488 nanometer coherent Sapphire laser beam that can be expanded and then adapted and positioned to perform light sheet scanning.

Illumination light from the light source 14 can be focused by the lens 66 to a line to its back focal plane to produce the light sheet 16. The illumination arm 24 can be configured to produce any suitable number of light sheets 16 that can be directed through the biological sample 18. As shown in FIG. 1, the illumination arm 24 provides a first light sheet 16-1 and a second light sheet 16-2 (collectively described herein as light sheet or sheets 16).

The illumination arm 12 further includes the illumination objective 20, a first illumination lens 62, and a second illumination lens 64. The first and second illumination lenses 62, 64 can include any suitable lens or lens systems that are configured to direct the light sheet 16 to the illumination objective 20. Although depicted as including two lenses 62, 64, the illumination arm 12 can include any suitable number of lenses or other optical elements that can assist in directing the light sheet 16 to the illumination objective 20. Further, the illumination objective 20 can include any suitable lens or combination of lenses.

An illumination mirror 68 (e.g., a galvanometric scan mirror (GSM)) can be disposed at a focal plane of the lens 66. The illumination mirror 68 can be configured to receive the light sheet 16 from the light source 14 and lens 66, and direct the light sheet to the illumination objective 20 by directing the light sheet to a back pupil of first illumination lens 62, through the first illumination lens, and to the second illumination lens 64, where the second illumination lens focuses the light sheet through the sample 18. The illumination mirror 68 can provide rapid shifting of the light sheet 16 along the detection arm 32 of the microscope 10. In one or more embodiments, the microscope 10 can include a controller 70 that includes one or more processors and that is connected to the GSM 68 using any suitable technique. The controller 70 can include any suitable controller or controllers. The controller 70 can be configured to manipulate the illumination mirror 68 to scan the sample 18 with the light sheet 16 using any suitable technique.

The biological sample 18 can include any suitable biological material or structure. In one or more embodiments, the biological sample 18 can be cleared utilizing any suitable technique. The sample 18 can be held in place or contained such that the light sheet 16 can be transmitted therethrough using any suitable technique. In one or more embodiments, any suitable sample holder (not shown) can be configured to contain the biological sample 18.

The light sheet 16 can be incident upon one or more portions 22 of the biological sample 18, thereby illuminating such portion. Such portion 22 of the biological sample 18 can be configured to emit light 28 in response to illumination by the light sheet 16. Any suitable technique can be utilized to prepare the biological sample 18 such that it emits light in response to illumination from the light sheet 16. In one or more embodiments, one or more fluorophores can be disposed within the sample 18 that are configured to absorb light energy from the light sheet 16, thereby exciting each fluorophore. Each fluorophore returns to its ground state by emitting light at a longer wavelength than a wavelength of the light of the light sheet 16. The emitted light 28 is unpolarized fluorescent light. The light sheet 16 can be configured to illuminate a thin section or image plane of the biological sample 18, exciting the fluorophores within the image plane. The emitted fluorescent light can be utilized to produce an image of the image plane of the portion 22 of the biological sample 18 that is illuminated with the light sheet 16.

The unpolarized fluorescent light 28 emitted from the sample 18 can be received by the detection objective 26 of the detection arm 32, which can be pupil matched to remote objective 42 using any suitable technique. In one or more embodiments, the detection objective 26 and the remote objective 42 can be pupil matched utilizing a first detection lens 72 and second detection lens 74. The detection objective 26 (along with detection lenses 72, 74 or any suitable optical elements or components) can further be configured to form an unpolarized light beam 30 that is representative of the image 19 (FIG. 2) of the sample portion 22. The detection objective 26 includes or is disposed along the optical axis 4 and can include any suitable objective or combination of optical elements. In one or more embodiments, the optical axis 4 is orthogonal to the illumination axis 2.

Figure 2:
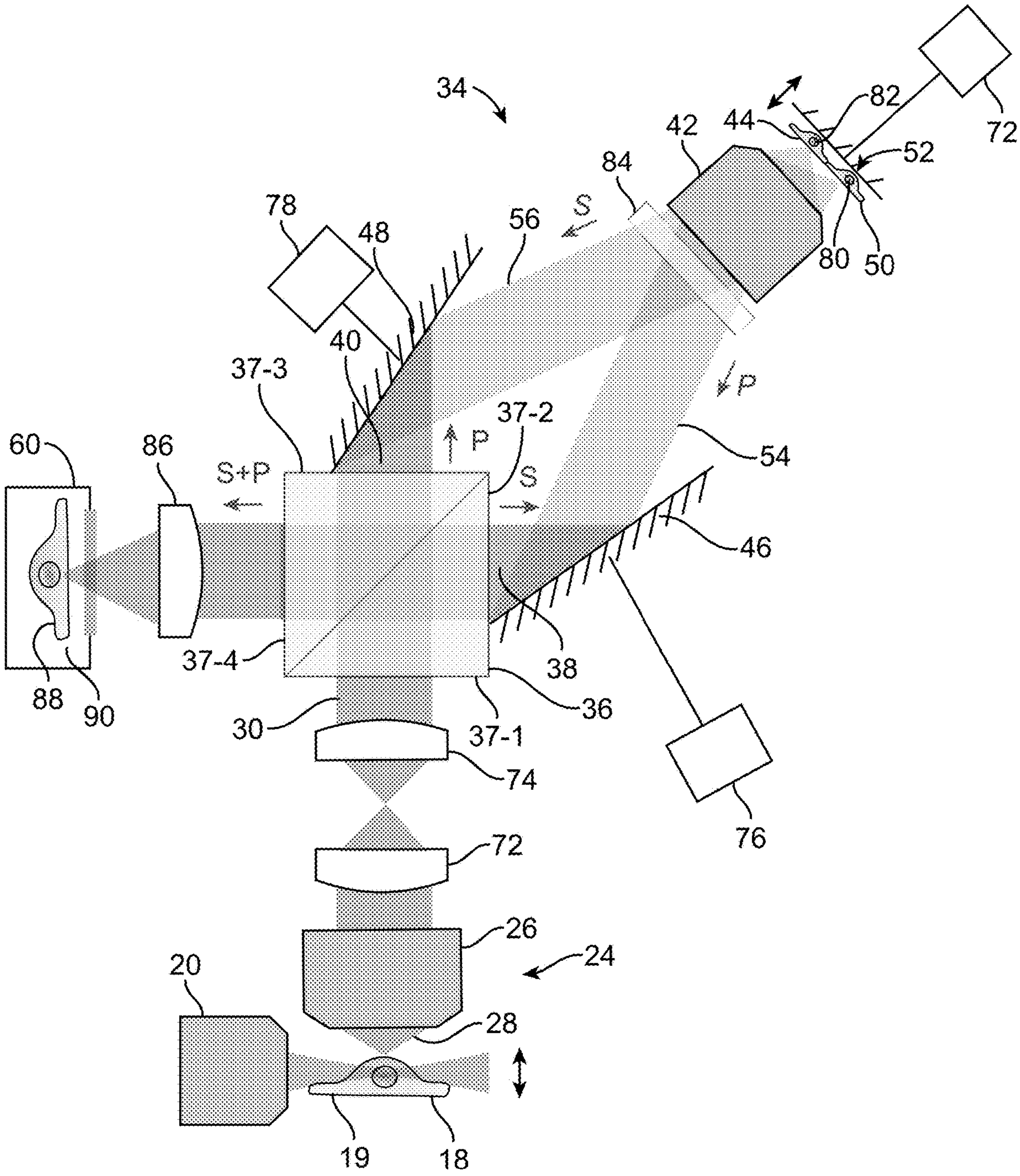
FIG. 2 is a schematic plan view of the remote focusing system of the microscope of FIG. 1.
Figure 3:
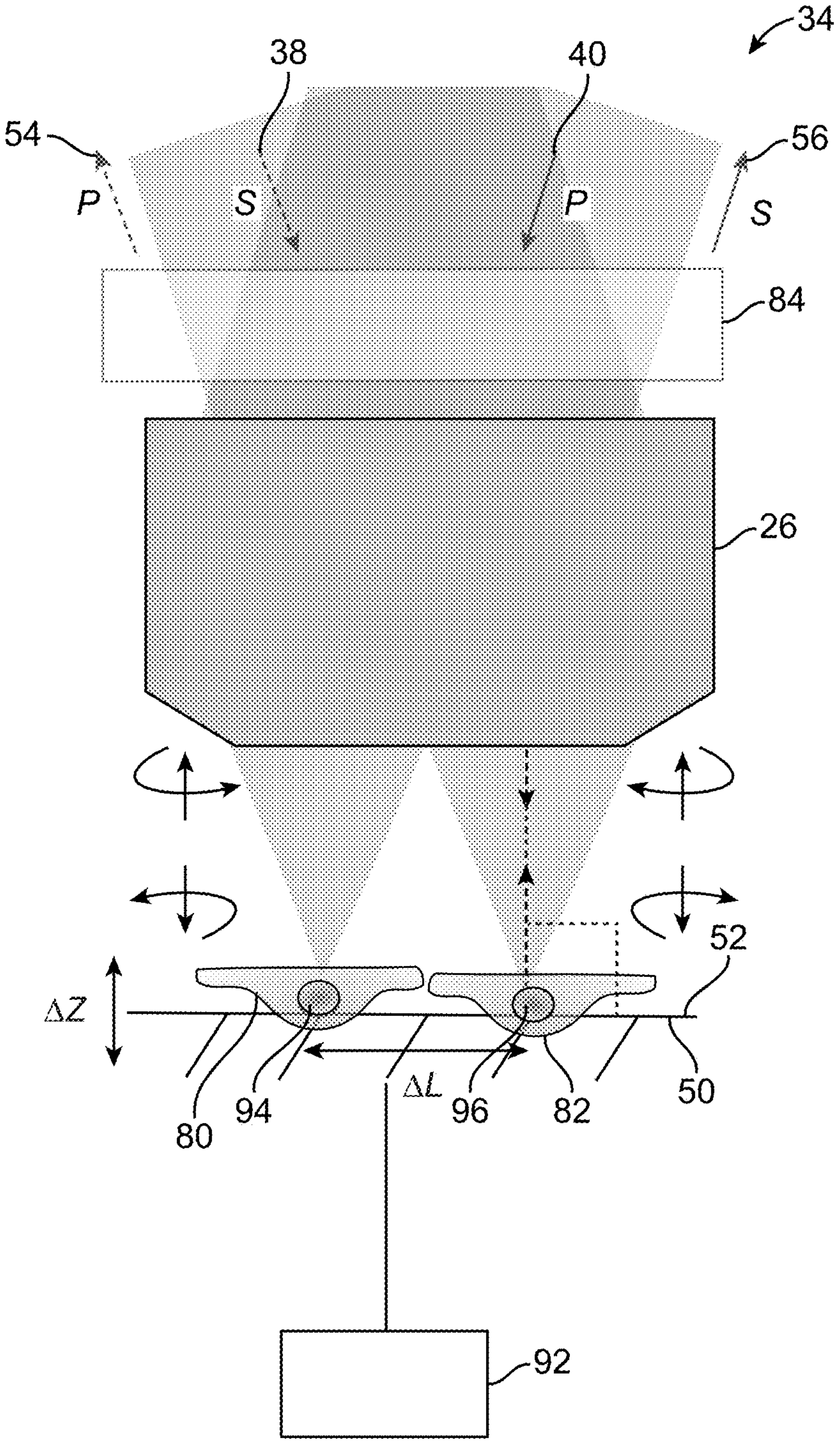
FIG. 3 is a schematic plan view of a remote objective and focal plane mirror of the remote focusing system of FIG. 1.

The detection arm 32 further includes the remote focusing system 34. FIG. 2 is a schematic plan view of the remote focusing system 34 and a portion of the illumination arm 24 of the microscope 10 of FIG. 1, and FIG. 3 is a schematic side view of a portion of the remote focusing system.

The remote focusing system 34 includes the polarizing beam splitter 36 (PBS) that is configured to split the unpolarized light beam 30 that is incident upon the beam splitter from the detection objective 26 into the first polarized light beam 38 and the second polarized light beam 40 using any suitable technique. The first and second polarized light beams 38, 40 exit the PBS 36 along orthogonal paths. The PBS 36 can be disposed in the infinity space of remote objective 42.

The PBS 36 can include any suitable PBS. In the illustrated embodiment, the PBS 36 includes a first face 37-1, a second face 37-2, a third face 37-3, and a fourth face 37-4. The unpolarized light beam 30 of light emitted by the sample 18 is incident upon the first face 37-1 and is polarized. The first polarized light beam 38 exits the PBS 36 through its second face 37-2, and the second polarized light beam 40 exits the PBS through its third face 37-3.

The first polarized light beam 38 can include any suitable first polarization. In one or more embodiments, the first polarization can be S-polarized light. Further, the second polarized light beam 40 can include any suitable second polarization. In one or more embodiments, the second polarization can be P-polarized light. The unpolarized light beam 30 is representative of the first image 19 of the portion 22 of the biological sample 18.

The remote objective 42 can include any suitable optical element or component and can be configured to focus the first polarized light beam 38 and the second polarized light beam 40 onto the focal plane 44 of the objective. In one or more embodiments, the detection objective 26 can be pupil matched to the remote objective 42 through first detection lens 72 and second detection lens 74, or any other suitable optical element or components.

The first polarized light beam 38 and second polarized light beam 40 can be directed or projected onto remote objective 42 using the first mirror 46 and the second mirror 48. The first and second mirrors 46, 48 can include any suitable mirror or mirrors. At least one of the first mirror 46 or the second mirror 48 are manipulable or repositionable using any suitable technique. In one or more embodiments, the first mirror 46 can be connected to a first actuator 76 and the second mirror 48 can be connected to a second actuator 78 that are configured to manipulate the first and second mirrors. Any suitable actuators 76, 78 can be utilized to manipulate mirrors 46, 48. In one or more embodiments, the first and second mirrors 46, 48 (via actuators 76, 78) can be connected to the controller 70 using any suitable technique. The controller 70 can be configured to manipulate at least one of the first mirror 46 or second mirror 48 as is further described herein.

The focal plane mirror 50 can be disposed at the focal plane 44 of the remote objective 42 and along the optical axis 6 (FIG. 1). A detection path 35 is defined between the PBS 36 and the focal plane mirror 50. Any suitable technique can be utilized to position the focal plane mirror 50 at the focal plane 44. In one or more embodiments, the controller 70 (FIG. 1) can be configured to manipulate the focal plane mirror 50 in a direction along the optical axis 6 using any suitable technique. For example, the focal plane mirror 50 can be connected to an actuator 92 that is configured to move the mirror along the optical axis 6. The actuator 92 can include any suitable actuator or actuators, e.g., a linear force actuator (LFA). The controller 70 can be connected to the actuator 92 using any suitable technique such that the controller can manipulate the focal plane mirror 50 in the direction (z-direction) along the optical axis 6. In one or more embodiments, the remote objective 42 is in a fixed position relative to the polarizing beam splitter 36 and the focal plane mirror 50.

The focal plane mirror 50 is translated along the optical axis 6 of the detection objective 42 with minimal or no angular deviation during the actuator's oscillatory motion. Such minimal angular deviation can prevent focal shifts between the paths of the first polarized light beam 38 and the second polarized light beam 40, ensuring that the resulting images from the polarized light beams remain focused on the detector 60 at the same time. This arrangement can provide that both beams 38, 40 return through their incoming paths as third polarized light beam 54 and fourth polarized light beam 56, resulting in alignment for overlaying the intermediate images 80, 82 to form the final composite image 88.

Because of this angular launch in infinity space of the first polarized light beam 38 and the second polarized light beam 40 by the first and second mirrors 46, 48, the remote objective 42 forms the first polarized intermediate image 80 of the portion 22 of the sample 18 based on the first polarized light beam 38 and the second polarized intermediate image 82 of the portion of the sample based on the second polarized light beam 40 at its focal plane 44. The first and second intermediate images 80, 82 are laterally shifted a distance delta L (FIG. 3) (as measured between a focus 94 of the first intermediate image and a focus 96 of the second intermediate image). In one or more embodiments, the intermediate images 80, 82 can be misaligned by a distance delta L of no greater than 5 millimeters. The focal plane mirror 50 is disposed at the focal plane 44 of the remote objective 42 such that the first polarized intermediate image 80 and the second polarized intermediate image 82 are provided on the reflective surface 52 of the mirror.

A quarter wave plate 84 can be utilized to convert the first polarization of the first polarized light beam 38 into a first circular polarization and the second polarization of the second polarized light beam 40 into a second circular polarization prior to the light beams being incident upon the reflective surface 52 of the focal plane mirror 50. Reflection of the light beams 38, 40 from the reflective surface 52 of the mirror 50 reverses their circular polarizations.

The focal plane mirror 50 is further configured to direct (e.g., reflect) the third polarized light beam 54 that includes the third polarization and representative of the first polarized intermediate image 80 to the first mirror 46 and the fourth polarized light beam 56 that includes the fourth polarization and representative of the second polarized intermediate image 82 to the second mirror 48. The quarter wave plate 84 converts the circular polarizations of the third polarized light beam 54 and the fourth polarized light beam 56 into the second polarization and first polarization respectively. Although the third polarized light beam 56 returns along the path of the first polarized light beam 38, its polarization is reversed from the first polarization of the first polarized light beam to the third polarized light beam. For example, the first polarized light beam 38 can include S-polarized light, while the third polarized light beam 54 can include P-polarized light. Similarly, the fourth polarized light beam 56 includes the first polarization (e.g., P-polarized light) while the second polarized light beam 40 includes the second polarization (e.g., S-polarized light).

The first mirror 46 in turn directs the third polarized light beam 54 to the polarizing beam splitter 36, and the second mirror 48 directs the fourth polarized light beam 56 to the PBS 36. For the returning light beams 54, 56, the PBS 36 acts as an optical valve, where the fourth polarized light beam is reflected while the third polarized light beam 54 is transmitted by the PBS. As a result, light having the first polarization and the second polarization exits the PBS 36 through its fourth face 37-4.

The third and fourth polarized light beams 54, 56 are then transmitted through a lens 86, which forms the first and second intermediate images 80, 82 at the detector 60, where the first intermediate image includes the first polarization (e.g., P-polarized light) and the second intermediate image includes the second polarization (e.g., S-polarized light). The lens 86 can be disposed between the detector 60 and the polarizing beam splitter 36 and can be configured to focus the third polarized light beam 54 and the fourth polarized light beam 56 onto the detection surface 90 of the detector. The lens 86 can include any suitable lens or other optical components. The first and second mirrors 46, 48 can be manipulated utilizing the controller 70 such that the first and second intermediate images 80, 82 are aligned at the detection surface 90 of the detector 60, thereby resulting in the final composite image 88 by an incoherent addition without any interference artifacts.

The detector 60 can include any suitable detector. In one or more embodiments, the detector 60 is a camera that includes a CCD array that defines the detection surface 90. Although not shown, in one or more embodiments, the microscope 10 can include two dichroic mirrors that can separate the third polarized light beam 54 and the fourth polarized light beam 56 (i.e., the field of view (FOV) of the detector 60) in half to obtain simultaneous dual color imaging, e.g., with 637 nanometer and 488 nanometer laser excitations.

As shown in FIG. 1, an angle theta is formed between the first polarized light beam 38 and the second polarized light beam 40. In one or more embodiments, it may be preferred that angle theta be as small as possible because such angle determines the distance delta L (FIG. 3) between the first polarized intermediate image 80 and the second polarized intermediate image 82. In one or more embodiments, the angle theta can be no greater than 10 degrees. In one or more embodiments, the angle theta can be no greater than 8 degrees. Further, in one or more embodiments, the angle theta can be no greater than 6 degrees. A smaller delta L can allow use of a smaller mirror 50 to carry out the remote-focusing, thereby reducing an inertial load on the actuator 92, and also enhancing its efficiency. Further, alignment of the images 80, 82 becomes less sensitive to tip-tilt misalignment of mirror 50. Minimizing angle theta may move the images 80, 82 towards a center of the field of view for certain types of objectives that can be utilized for remote objective 42, which may help reduce field dependent aberrations and improve the collection efficiency of the objective.

Delta L can have any suitable value or range of values. In one or more embodiments, delta L can be no greater than 5 millimeters. In one or more embodiments, delta L can be no greater than 2 millimeters. In one or more embodiments, delta L can be no greater than 1.5 millimeters.

Figure 4:
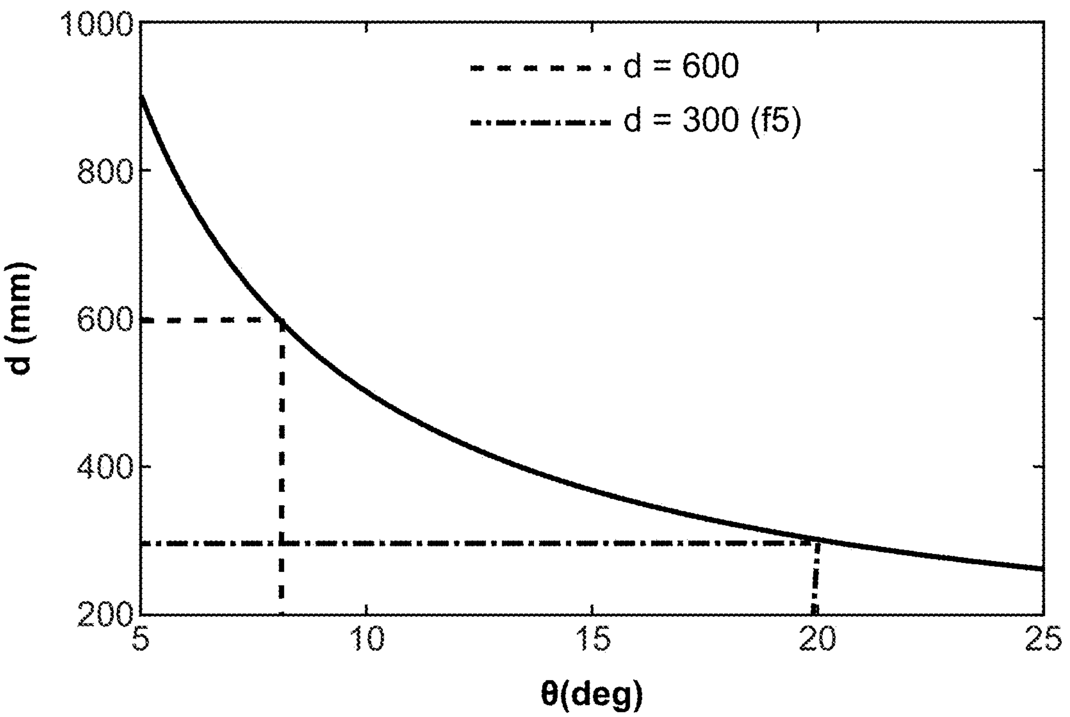
FIG. 4 is a graph of a length of a detection path of the remote focusing system of FIG. 1 versus an angle theta between a first polarized light beam and a second polarized light beam as the light beams are incident upon the remote objective of the remote focusing system.

An inverse relationship can exist between the angle theta and a distance between the remote objective 42 and the PBS 36 as shown in FIG. 4, which is a graph of such distance versus angle theta. Because of this relationship, either a 4f system can be preserved, or angle theta can be minimized. By matching detection objective 26 and the remote objective 42, the 4f system (with matching lenses 72, 74) can provide an angle theta of 20 degrees as shown in FIG. 4. Operating in this range, however, may make it difficult to ensure that both reflected beams 54, 56 are entirely captured by the remote objective 42. By forgoing preservation of a 4f system, resolution of the images 80, 82 can be comparable to that of diffraction-limited systems. In general, when the distance d is set to 300 millimeters in a 4f system, reaching an angle theta of 20 degrees may make it difficult to ensure that both reflected beams are entirely captured by the remote objective 42. By selecting d to be 600 millimeters, which deviates from the 4f system, an angle theta of 8 degrees can be achieved, thereby ensuring that both reflected beams are fully captured by the remote objective.

Further, because two identical images 80, 82 are generated at the detector 60 using light having the first polarization and second polarization, precise alignment of these images can produce a higher quality final composite image 88. A cross-correlation-based algorithm that quantifies the shift between overlayed images 80, 82 in real-time with sub-pixel accuracy can be utilized, thereby allowing interactive adjustment of the mirrors 46, 48 by the controller 70 during system alignment.

As mentioned herein, the microscope 10 can include the controller 70 that can include one or more processors. The controller 70 can be configured to manipulate the first mirror 46 and the second mirror 48 using any suitable technique such that the first polarized intermediate image 80 and the second polarized intermediate image 82 are aligned at the detection surface 58 of the detector 60 to provide the final composite image 88 using any suitable technique. Further, the controller 70 can be configured to manipulate the focal plane mirror 50 in a direction along the optical axis 6 (i.e., the Z direction as shown in FIG. 3) such that the mirror is disposed at the focal plane of the remote objective 42. In one or more embodiments, the controller 70 can further be configured to synchronously manipulate the illumination mirror 68 and the focal plane mirror 50 using any suitable technique. Because the position of the actuator 92 determines the focal plane 44 of the remote objective 42, the illumination mirror 68 and the actuator 92 can be synchronously manipulated by the controller 70 using any suitable signal, e.g., a sawtooth signal. Synchronization of movement of the illumination mirror 68 and the focal plane mirror 50 can enable the detection path to be focused on the focal plane 44 of the first polarized light beam 38 and second polarized light beam 40.

Figure 5:
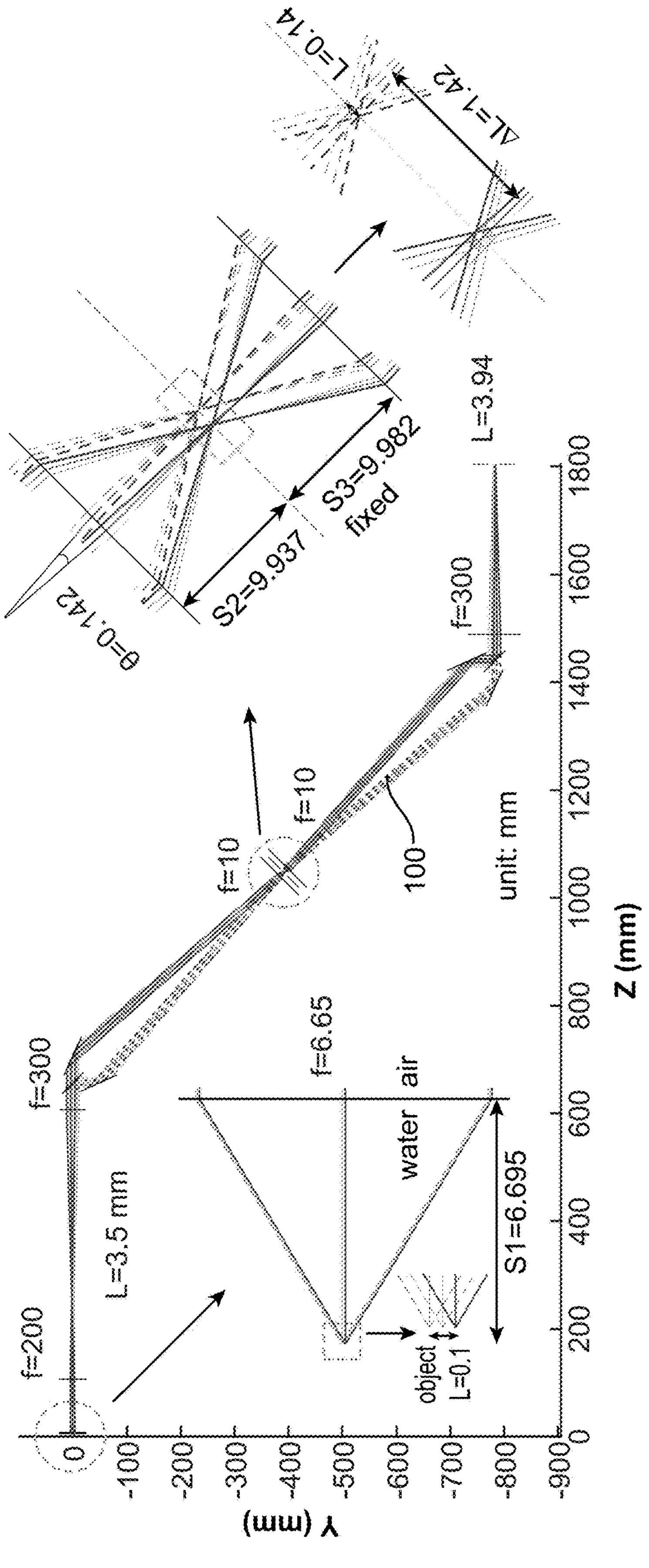
FIG. 5 are images of 200 nanometer beads formed by S, P, and S+P polarized light beams utilizing the microscope of FIG. 1.

As shown in FIG. 5, the remote focusing system 34 was simulated by ray tracing of its detection path 35. The ray tracing assumes all rays satisfy paraxial approximation and all lenses are thin lenses. The detection objective 42 is a water immersion objective. An effective focal length of the detection objective 42 was modeled as $f_{obj}=(f_{Tube}\ n)/M_{obj}$, where $f_{Tube}$ is the focal length of the designed tube lens 86, $M_{obj}$ is the magnification of the objective, and n is the refractive index of water. Here, $f_{obj}$ is equal to 6.65 millimeter. The detection path 35 is modeled two times to simulate the forward and backward transmission through the remote detection system 34. The LFA is omitted from the simulation. Instead, the distance between the two copies of the remote objectives 42 is changed so that the distance ($S_3$) of the image plane 44 (curve 100) to the second remote objective remains constant. An objective of 100 μm was simulated. Further, the image size after the remote objective 42 was ~140 μm, indicating a lateral magnification of 1.4, which is close to the requirement of perfect imaging with $M_{lateral}=n_{water}/n_{air}=1.33$. This 5% magnification mismatch is limited by the geometry of the remote focusing system. The separation (delta L) of the first polarized intermediate image 80 and the second polarized intermediate image 82 formed by remote objective 42 is approximate to $\Delta L=f_{ro}\ \theta$ (the focal length of the remote objective 420), where $f_{ro}=10$ millimeters is the effective focal length of the remote objective and θ is the angle between the first polarized light beam 38 and the second polarized light beam 40 meeting at the remote objective. The larger the delta L, the larger the aberration introduced by the remote objective.

Figure 6:
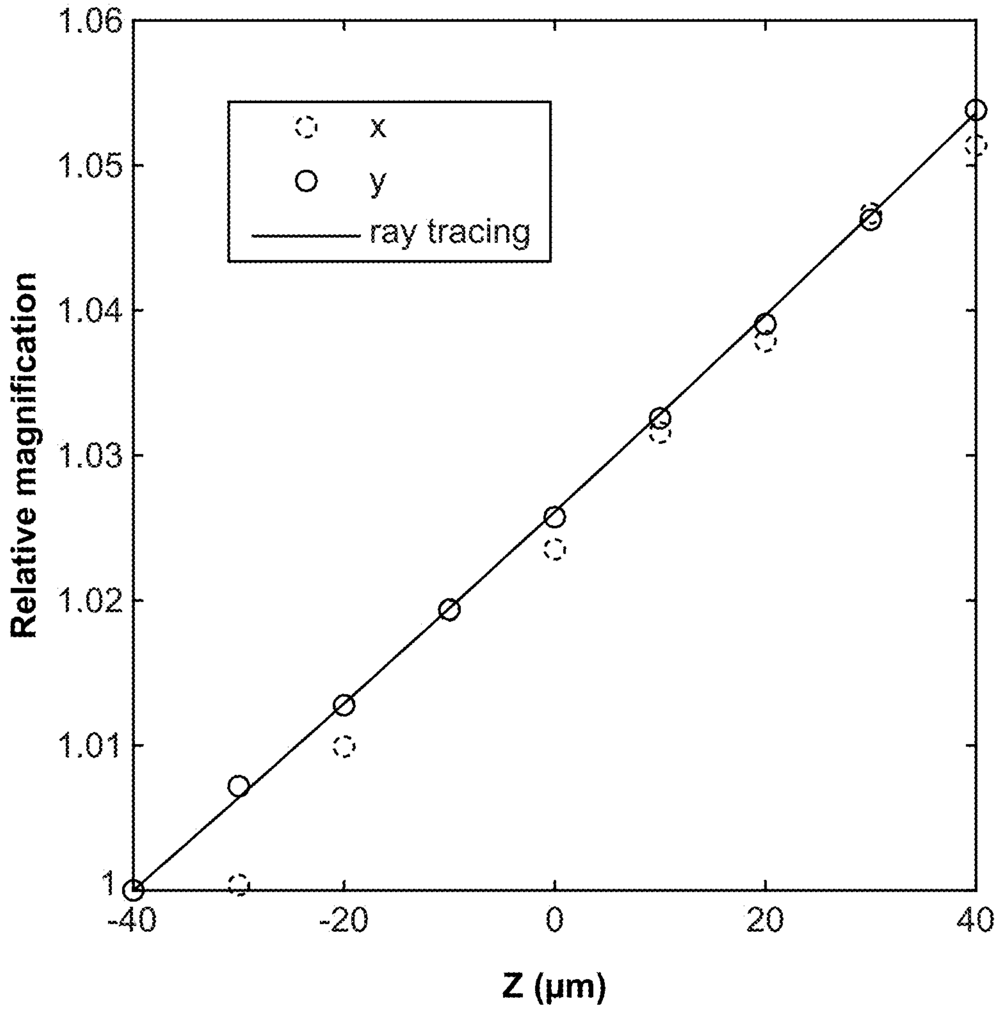
FIG. 6 are graphs corresponding to the images of FIG. 5 that show signal intensity (arbitrary units) versus width of each image.

To reduce delta L, the remote objective 42 is located at ~500 millimeters from the PBS 36; therefore, the remote focusing system 34 is no longer an exact 4f system, and the magnification, $M_{lateral}$, varies with the axial position of the objective. Further, the beam path from the detection objective detection objective 26 to the first lens 72 is also not a 4f system, where the tube lens is ~100 millimeters away from the detection objective. The combination of the two non-4f systems can partially reduce the axial dependence of the magnification. FIG. 6 shows the change of the lateral magnification with respect to the galvo position (the axial position of the light sheet 16) from both ray tracing and the experimental data. There is a ~5% magnification change over an axial range of 80 micrometers.

Figure 7:
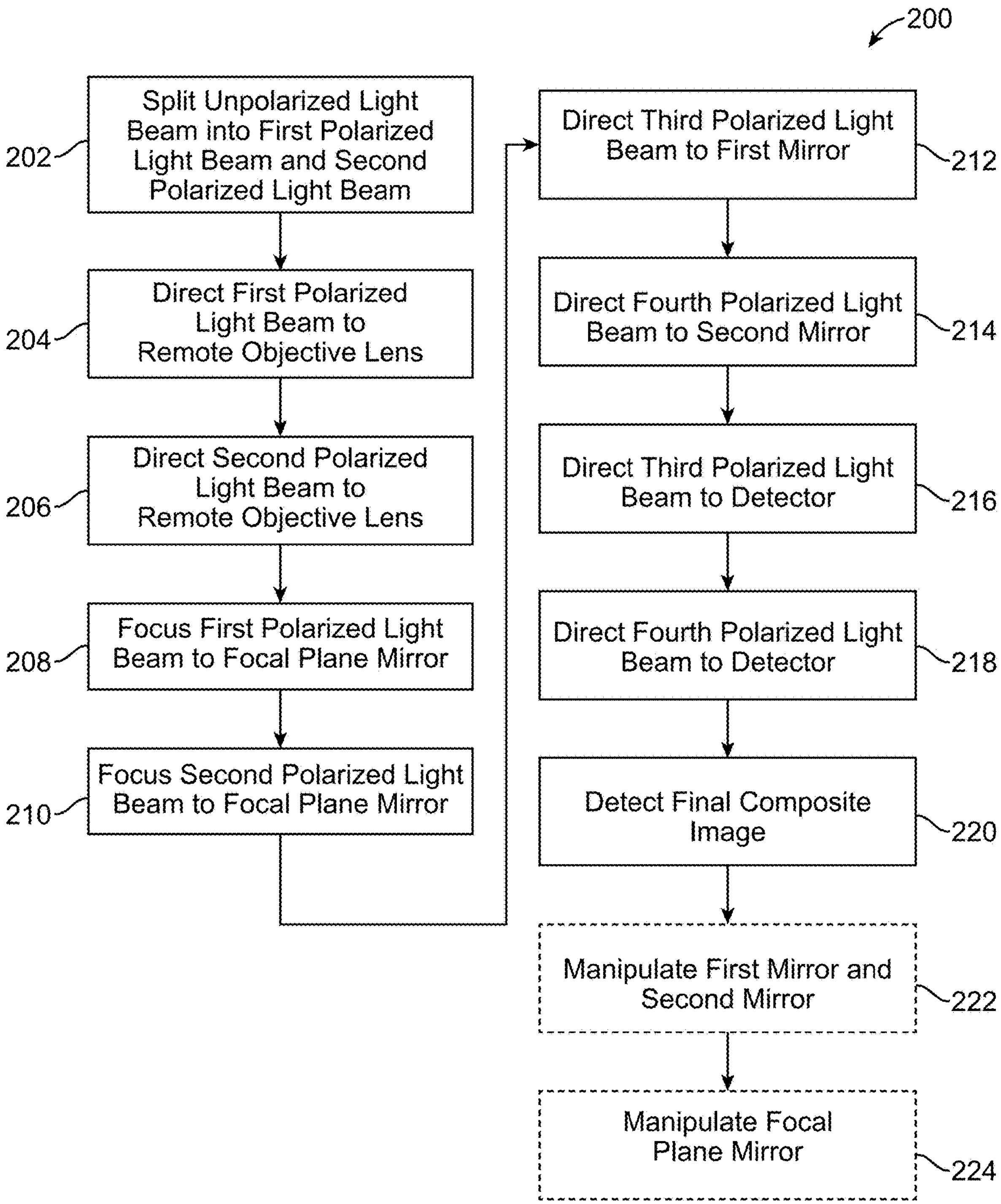
FIG. 7 is a graph of modeled ray tracing of the detection path of the remote focusing system of the microscope of FIG. 1.

Any suitable technique can be utilized with the microscope 10 to provide one or more images of the biological sample 18. For example, FIG. 7 is a flowchart of one method 200 that can be utilized with the microscope 10. Although described regarding microscope 10 and the remote focusing system 34, the method 200 can be utilized with any suitable microscope and remote focusing system. At 202, the unpolarized light beam 30 that is incident upon the beam splitter 36 can be split into the first polarized light beam 38 and the second polarized light beam 40 using any suitable technique. The unpolarized light beam 30 is representative of the image 19 of the portion 22 of the biological sample 18. At 204, the first polarized light beam 38 is directed to the remote objective 42 utilizing the first mirror 46. Further, the second polarized light beam 40 is directed to the remote objective 42 at 206 utilizing the second mirror 48. At 208, the first polarized light beam 38 is focused to the reflective surface 52 of the focal plane mirror 50 utilizing the remote objective 42 to provide the first polarized intermediate image 80 of the portion 22 of the sample 18. The second polarized light beam 40 can be focused to the reflective surface 52 of the focal plane mirror 50 utilizing the remote objective 42 at 210 to provide the second polarized intermediate image 82 of the portion 22 of the sample 18.

At 212, the third polarized light beam 54 that is representative of the first polarized intermediate image 80 can be directed to the first mirror 46 utilizing the focal plane mirror 50. And at 214, the fourth polarized light beam 56 that is representative of the second polarized intermediate image 82 can be directed to the second mirror 48 utilizing the focal plane mirror 50. The third polarized light beam 54 can be directed through the polarizing beam splitter 36 to the detection surface 58 of the detector 60 at 216 utilizing the first mirror 46. At 218, the fourth polarized light beam 56 can be directed through the polarizing beam splitter 36 to the detection surface 58 of the detector 60 utilizing the second mirror 48. Further, at 220, the final composite image 88 of the portion 22 of the biological sample 18 can be detected utilizing the detector 60 using any suitable technique.

At 222, the first mirror 46 and the second mirror 48 can optionally be manipulated such that the first polarized intermediate image 80 and the second polarized intermediate image 82 are aligned at the detection surface 58 of the detector 60 to provide the final composite image 88 using any suitable technique. In one or more embodiments, the controller 70 can be configured to manipulate the first and second mirrors 46, 48 such that the intermediate images 80, 82 are aligned at the detection surface 58 detector 60. Further, at 224, the focal plane mirror 50 can optionally be manipulated in the direction along the optical axis 6 using any suitable technique such that the reflective surface 52 is at the focal plane 44 of the remote objective 42. In one or more embodiments, the controller 70 can be configured to manipulate the focal plane mirror 50 along the optical axis 6.

EXAMPLE

In general, the microscope set-up and following examples are described in Tonmoy Chakraborty, et al., Axial descanning using remote focusing in the detection arm of light-sheet microscopy, 3 Oct. 2023, PREPRINT (Version 1) available at Research Square <doi.org/10.21203/rs.3.rs-3338831/v1>.

Microscope Design

Figure 8:
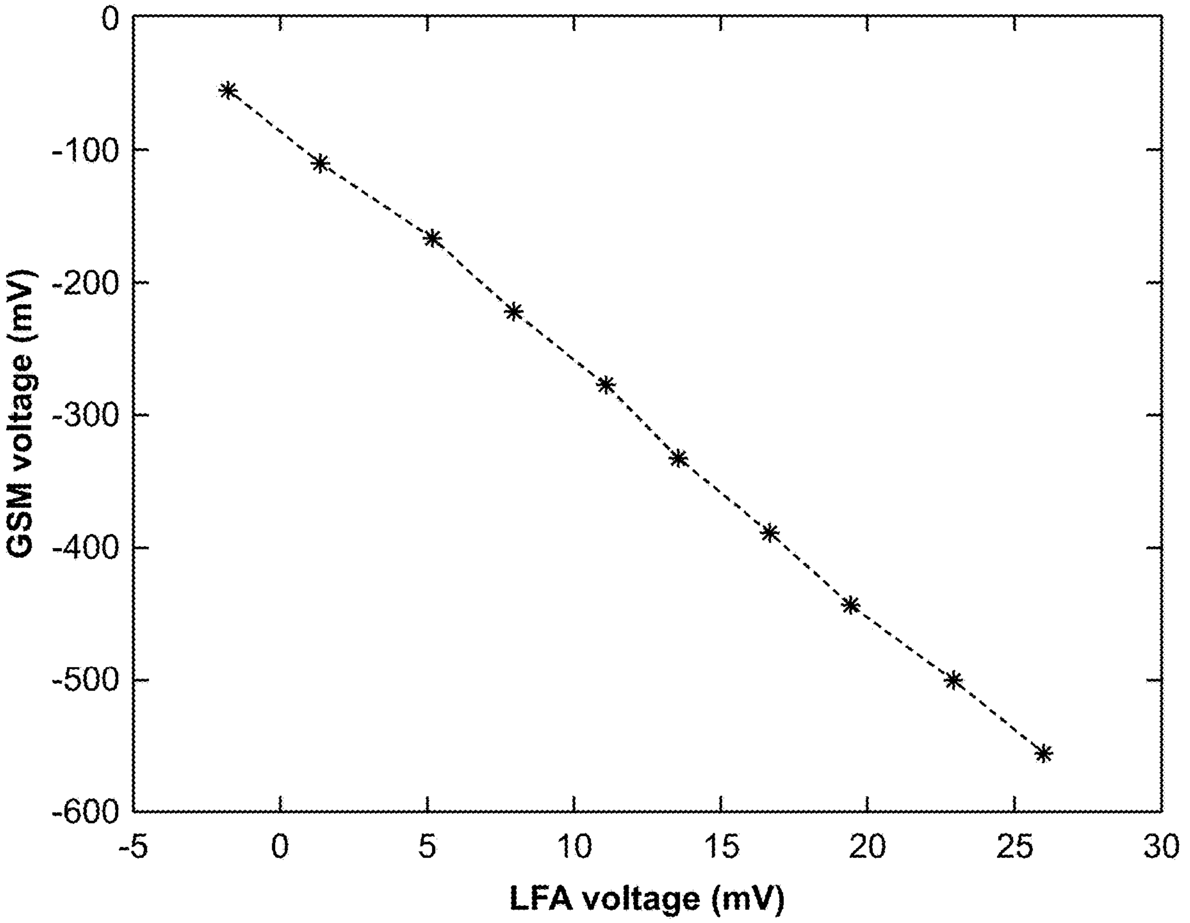
FIG. 8 is a graph that illustrates calibration of lateral magnification at various remote object positions for a target illuminated by a white light LED that is imaged for magnification measurement.

The microscope 10 of FIG. 1 was utilized to image 200 nanometer beads and mast cells. Each sample 18 was illuminated by a light sheet 16 generated with a cylindrical lens 66 in the illumination arm 24, and the emitted fluorescence from the sample 18 was collected by the detection objective 26, which was set orthogonal to the illumination objective 20 to capture 2D information from the sample. A galvanometric scan mirror (GSM) 68 in the illumination arm 24 translated the light sheet 16 in the Z-direction. Because the position of the LFA 92 in the detection arm 32 determines the focal plane 44 of the detection objective 42, the GSM 68 and the LFA 2 were synchronized with the sawtooth signal from controller 70 to ensure that the detection path 35 was focused on the plane of the light sheet 16. The voltages applied to the GSM 68 and the LFA 92 are shown in FIG. 8. Volumetric imaging can be performed by the microscope 10 by acquiring a sequence of images from different focal planes. The LFA 92 moves back and forth rapidly, synchronized with the movement of the GSM 68 to enable collection of 3D image stacks of the sample 18.

The optical correction of defocus in the high-NA microscope 10 allowed fast de-scanning of a 3D volume over an axial range of ~70 μm at speeds limited primarily by the detector 60 frame rate (799 frames/s at 2304×256 pixels using Hamamatsu Orca-fusion BT, available from Hamamatsu Photonics, Hamamatsu City, Japan).

A dual-color imaging strategy was utilized by partitioning the FOV, enabling the simultaneous capture of two distinct fluorescent labels within each slice without sacrificing imaging speed. To accomplish this, a pair of dichroic mirrors were utilized to separate the emitted wavelengths from the two labels into side-by-side dual-color images. Once acquired, these separate image sets were registered and merged to generate 4D (X, Y, Z, and wavelength lambda) stacks. By sequentially capturing 4D stacks, 5D (X, Y, Z, wavelength lambda, and time) datasets were acquired, which enable tracking of dynamic behavior of biological processes. The microscope 10 as configured was wavelength-independent, an attribute not feasible with technologies like diffractive tunable lenses or spatial light modulators.

The illumination arm 24 included two light sources: 1) a Coherent Sapphire 488 nanometer laser (available from Coherent Corp., Saxonburg, Pennsylvania); and 2) an Obis LX 637 nanometer laser (Coherent Corp.). Illumination light from the two lasers were combined with a dichroic beam splitter (LM01-503-25, available from Idex Health & Science, Carlsbad, California). The laser beams were focused through a 50 micron pinhole (P50D, available from Thorlabs, Inc., Newton, New Jersey) by a 45 millimeter achromatic doublet (AC254-045-A, Thorlabs, Inc.) and then recollimated using a 150 millimeter achromatic doublet (AC254-150-A-ML, Thorlabs, Inc.). The original beams were expanded by 9 folds with a 3× Galilean beam expander (GBE03-A, Thorlabs, Inc.) before being focused with the cylindrical lens 66 (ACY254-50-A, Thorlabs, Inc.), onto a resonant mirror galvanometer 68 (CRS 4 kHz, available from Cambridge Technology, Bedford, Massachusetts), driven by a 12 volt power supply (A12MT400, available from Acopian Technical Company, Easton, Pennsylvania), to wobble the light sheet 16. The one-dimensional focus was then recollimated with a 100 millimeter achromatic doublet (AC254-100-A-ML, Thorlabs, Inc.) and was directed to the GSM 68 (GVS111, Thorlabs, Inc.), driven by a 15 volt power supply (GPS011, Thorlabs, Inc.), for rapid shifting of the light sheet 16 along the detection arm 32. This GSM 68 was conjugated to the back pupil of the illumination objective 20 (Nikon 40×/0.8 NA, available from Nikon Instruments Inc., Melville, New York) through 100 millimeter and 200 millimeter achromatic doublet lens 62, 64 (AC508-100-A-ML and AC508-200-A-ML, Thorlabs, Inc.).

In the detection arm 32, the same objective 26 as the illumination objective 20 (Nikon 40×/0.8 NA) was disposed orthogonally and pupil-matched to the illumination objective (Nikon Plan Apo 20×/0.75 NA, Nikon Instruments Inc.) through a 200-millimeter tube lens 72 (TTL200-A, Thorlabs, Inc.) and a 300-millimeter achromatic doublet lens 74 (AC508-300-A-ML, Thorlabs, Inc.). A 50:50 polarizing beam splitter (PBS) (10FC16PB.3, available from Newport Corporation, Irvine California), split the emitted beam into S- and P-polarized light beams 38, 40. Using first and second mirrors 46, 48, these light beams 38, 40 were then launched at an angle towards the remote objective 42.

Angle theta between the light beams 38, 40 was 8 degrees. The S- and P-polarized light passed through the quarter waveplate 84 (AQWP10M, Thorlabs, Inc.) and were focused onto the light plane mirror 50 positioned at the focal plane 44 of the remote objective 42. The focal plane mirror 50 (PF03-03-P01—Ø7.0 millimeter Protected Silver Mirror, Thorlabs Inc.) was attached to a voice coil with a travel of 10 millimeters, a positional repeatability of fewer than 50 nanometers, and a response time of fewer than 3 milliseconds (LFA-2010, Equipment Solutions, Inc., Sunnyvale, CA). Then the reflected light was recaptured by the same remote objective 42 and quarter-wave plate 84 to rotate the beams' polarization state. The resulting third and fourth polarized light beams 54, 56 were directed toward the detector 60 (Orca-fusion BT cMOS Camera, Hamamatsu, Inc.) by reflection from the same PBS 36 and a 300-millimeter achromatic doublet lens 86 (AC508-300-A-ML, Thorlabs, Inc.). For emission filters, two long-pass filters (FF01-525/30-25, and BLP01-647R-25, Idex Health & Science), for blue, and far-red, respectively were utilized. To image dual channels simultaneously, the FOV was separated into half using dichroic mirrors (DMLP605R, Thorlabs, Inc.) between the 300 millimeter achromatic doublet and the detector 60. The biological sample 18 and the illumination and detection objectives 20, 26 were immersed in a chamber designed using Adobe Inventor and machined through Proto Labs, Inc. (Maple Plain Minnesota). The LFA 92 and the GSM 68, in the detection and illumination arms 32, 24 respectively, were synchronized to keep the translated light sheet 16 in the focus of the detection objective 42 to acquire a 3D stack of the biological sample 18.

Overlaying S and P Images with Sub-Pixel Accuracy

First and second polarized intermediate images 80, 82 corresponding to S- and P-polarized light were formed at the detector 60 and added incoherently to generate the final composite image 88. A custom-written MATLAB script to monitor the offset between the two images in near real-time while adjusting the positions of the first and second mirrors 46, 48 was utilized.

The offset between the two intermediate images 80, 82 using a cross-correlation-based algorithm (see Wester, M. J. et al., Robust, fiducial-free drift correction for super-resolution imaging. *Sci. Rep.* 11, 23672 (2021)) was utilized to achieve sub-pixel accuracy by fitting second-order polynomials through the peak of the scaled cross-correlation between the S- and P-polarized images.

Initially, an image is acquired as a reference by obstructing one optical path (either S or P). Subsequently, the alternative optical path was used to collect new images. The shift between each new image and the reference image were then measured using the method described in Wester, M. J. et al. While new images were being collected, first and second mirrors 46, 48 were adjusted to minimize the shift.

Microscope Control

A Dell Precision 7920 computer with two processors (Intel® Xenon® Silver 4210R CPU) having a processing speed of 2.40 GHz and 2.39 GHz and with integrated 128 GB RAM (available from Dell Inc., Round Rock, Texas) was used to acquire the microscope's data. An NVIDIA Quadro RTX 4000 Graphics processing unit (GPU) with dedicated memory of 8 GB and shared memory of 63.8 GB (GPU memory of 71.8 GB) (available from Nvidia Corporation, Santa Clara, California) was also integrated into the system. LabView 2020 64-bit was utilized to work with the required software, including the LabView Run-Time Engine, Vision Run-Time Module, Vision Development Module, and other required drivers like NI-RIO drivers (available from National Instruments Corporation, Austin, Texas). DCAM-API software was used for the Active Silicon Firebird frame-grabber to actively interfere with the scientific complementary metal-oxide semiconductor (sCMOS) camera 60 (ORCA-Fusion BT Digital CMOS camera, model: C15440-20UP). It generated deterministic transistor logic (TTL) trigger sequences through 150 Watts shutter instrument (100-240 V~50/60 Hz; model: MP-285A, available from Sutter Instrument Company, Novato, CA) with a field programmable gate array (FPGA) (PCIe 7852R, National Instruments Corporation). The generated triggers controlled the resonant mirror galvanometers, placement of the stage, voice coils, blanking and modulation of laser, firing camera, and other external triggers. K-Hyper Terminal software facilitated engaging LFA with the system hardware.

Sample Preparation

Figure 9:
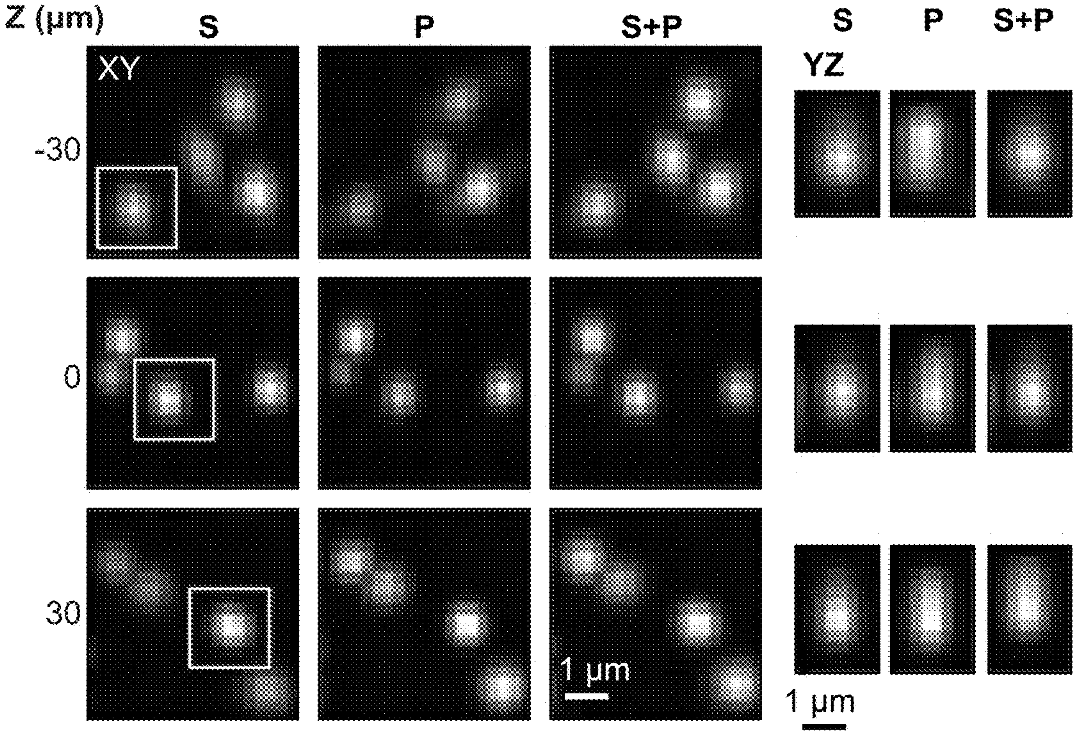
FIG. 9 are images of maximum intensity projections of data acquired on 200 nanometer beads from 10 slices in a Z direction.

To evaluate the performance of the de-scanning system, 3D volumes of 200 nanometer beads embedded in a 2% agarose cube were imaged across the scan range and accessed the quality of the generated point spread functions (PSFs). FIG. 9 displays the beads' maximum intensity projections (MIPs) across the scan range. For comparison S, P, and combined S+P images are shown at the beginning (−30 μm), center (0 μm) and end (+30 μm) of the scan range. These MIPs are generated from ten consecutive axial slices with a step size of 500 nanometers, using raw, unprocessed images. The remote focusing setup demonstrated close to diffraction-limited performance over a scan range of ~70 μm. As evident from the S and P images, the quality of the beads visually appeared similar across the entire scan range, thereby resulting in a similar S+P image. In the axial direction (the YZ view), the PSF widths were limited by the waist of the Gaussian light sheet (beads from red boxes in the XY view), which was determined by the tradeoff that exists between the FOV and axial resolution. To image an entire cell, a light sheet 16 that would generate an FOV of ~8 μm was required. As a result, the NA of the illumination objective 20 was reduced, and a light sheet 16 that gives a minimum axial resolution of ~850 nanometer (quantified by FWHMz of bead images) was chosen.

Figure 10:
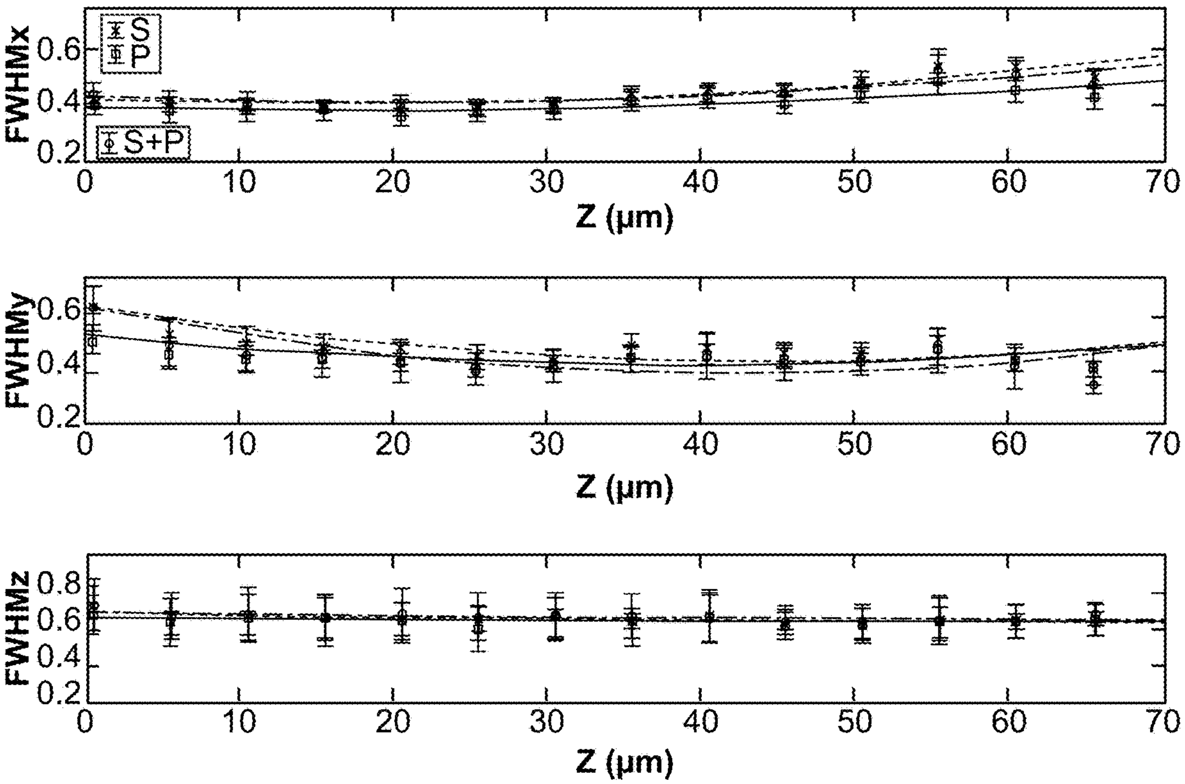
FIG. 10 are graphs corresponding to the images of FIG. 9 illustrating full width half maximum (FWHM) over lateral and axial directions of a scan range.

FIG. 10 displays the measured FWHMs from 200 nanometer beads for S, P, and S+P polarized images in the lateral (XY) and axial (Z) directions across the entire scan range. 20 randomly chosen beads were selected at each Z position. The selection criteria for the beads at each Z position included ensuring that they were well-separated to prevent overlap in measurements and sufficiently bright for accurate resolution assessment. Selection was performed by MATLAB code, where beads were chosen by cross-correlation between the maximum intensity projection of the PSF model along Z and beads in each of 10 slices. The circles indicate the mean resolution measurements obtained from the beads at each Z position, providing a point of reference for the average system performance at different depths. The error bars show the standard deviation from the mean resolution at each Z position, quantifying the spread of measurements and thus the consistency of the system's performance across the field of view. The dotted line represents the polynomial curve fitting over average data (circles). It serves as a trend to show resolution changes over the scanning range. FIG. 10 shows a lateral FWHM of 570±26 nanometers and 666±44 nanometers in X and Y directions at the center of the scan range respectively, which slowly increases as the beads move away from the nominal focal plane. This can be attributed to residue index mismatch aberrations that were not corrected by the remote focusing system. Additionally, the S polarization path suffered more in lateral resolution compared to the P polarization path, and the trend is different along the X and Y directions. This asymmetric FWHMs (X-Y) across the scan range (Z) and the discrepancy between S and P paths are likely due to field-dependent aberrations from the remote objective 42, where the S and P images were formed at different field points of the remote objective. Further, the microscope showed a nearly constant axial FWHM of ~920 nanometer over the entire scan range as the axial resolution is mainly determined by the light sheet waist.

Bead Sample 200 nanometer beads embedded in 2% agarose gel were used for microscope resolution assessment. To make 2% agarose gel, 2 g of agarose powder (A9045-25G, available from MilliporSigma, Burlington, Massachusetts) was mixed with 100 milliliters water and swirled thoroughly before putting into the microwave oven to heat. Once the solution boiled and got completely clear and the agarose was dissolved, the solution was removed from the oven and let it cool down. Then, 200 nanometer beads (YG, available from Polysciences, Inc., Warrington, Pennsylvania) were mixed with water with a ratio of 1/100 to form a solution of the 200 nanometer beads. The mixture was sonicated before mixing with the molten 2% agarose gel with a volumetric ratio of 1/10. Then this molten combination was poured into the cubic mold where the sample holder was placed and sat there for a few minutes to dry and form a 1 cubic centimeter cubic sample (200 nanometer beads embedded into 2% agarose gel) attached to the sample holder.

Fast 3D Live Cell Imaging

As a first demonstration of the 3D cellular imaging capabilities, 3D motion of secretory granules in living mast cells were monitored. Mast cells possess distinct secretory granules that contain the mediators of the allergic response and are released upon mast cell activation by allergen. These granules are distributed across the cytosol and have been shown to undergo both Brownian diffusion and directed motion. Upon activation of the membrane receptor, FcεRI, via crosslinking by multivalent antigen, the granules undergo increased directed motion that moves them to the plasma membrane where they will fuse and release mediators that regulate allergic responses.

Figure 11:
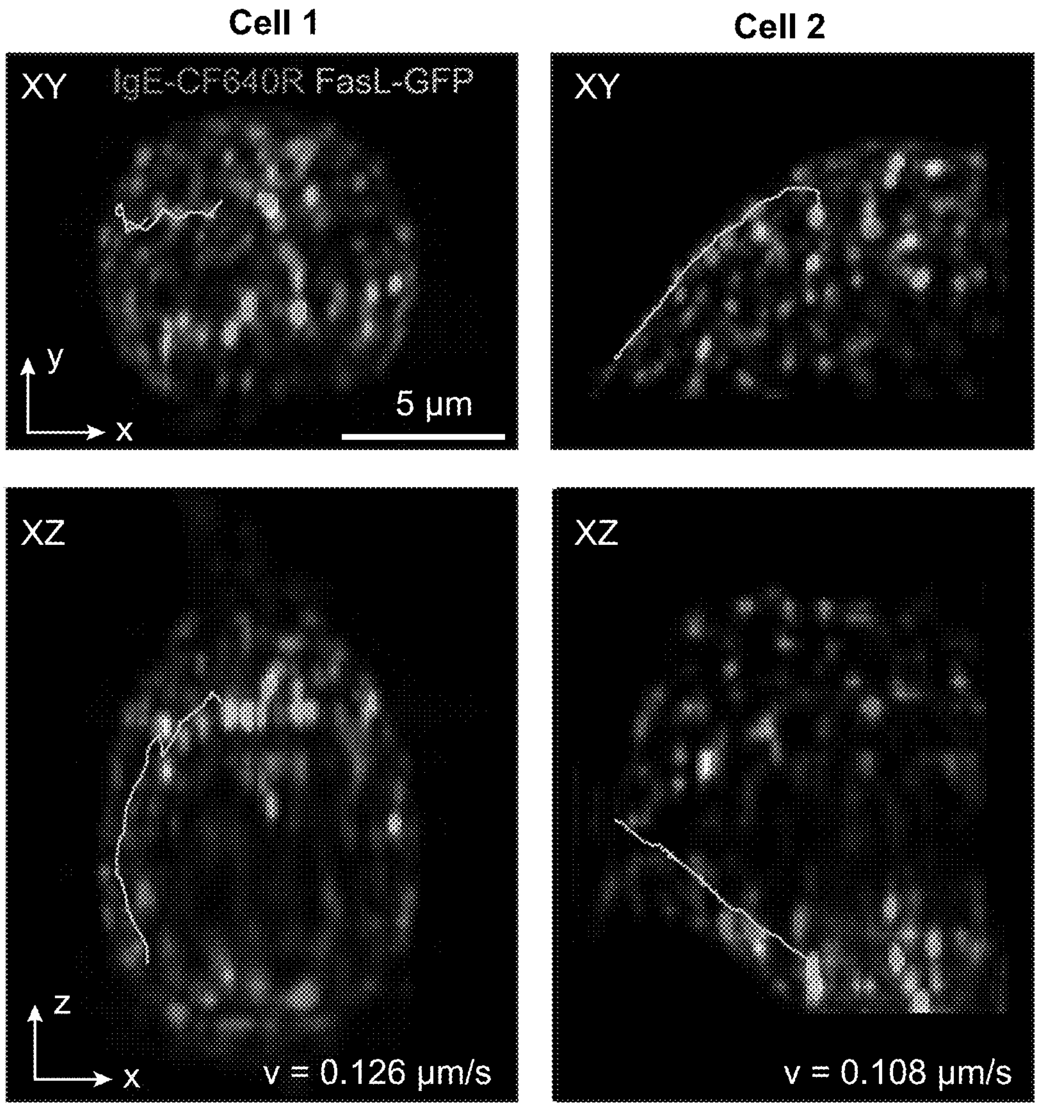
FIG. 11 are maximum intensity projection views of cell images at one-time point and an overlay with representative trajectories of granule movement (orange lines).
Figure 12:
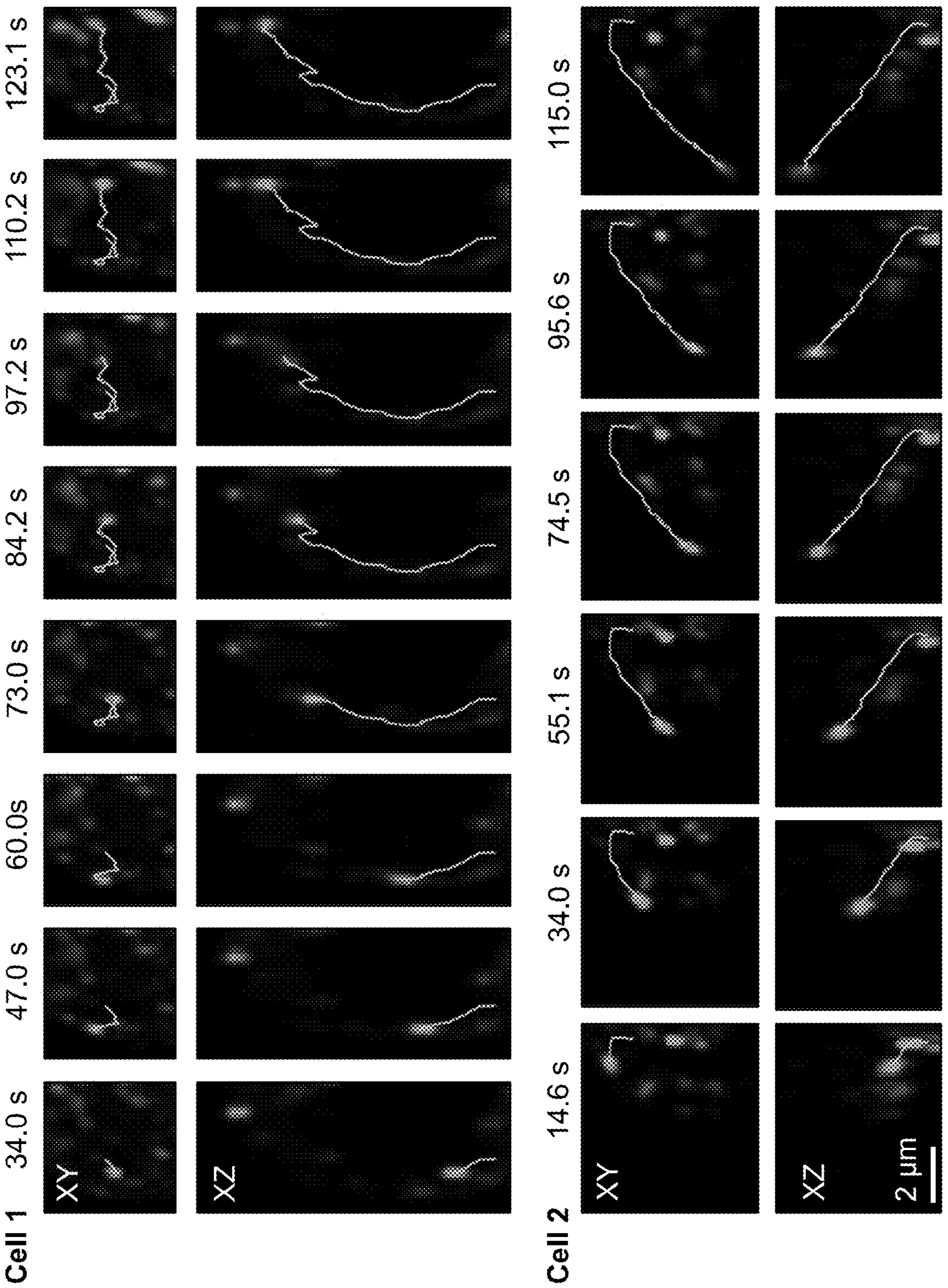
FIG. 12 are time series images of the trajectories in FIG. 11.
Figure 13:
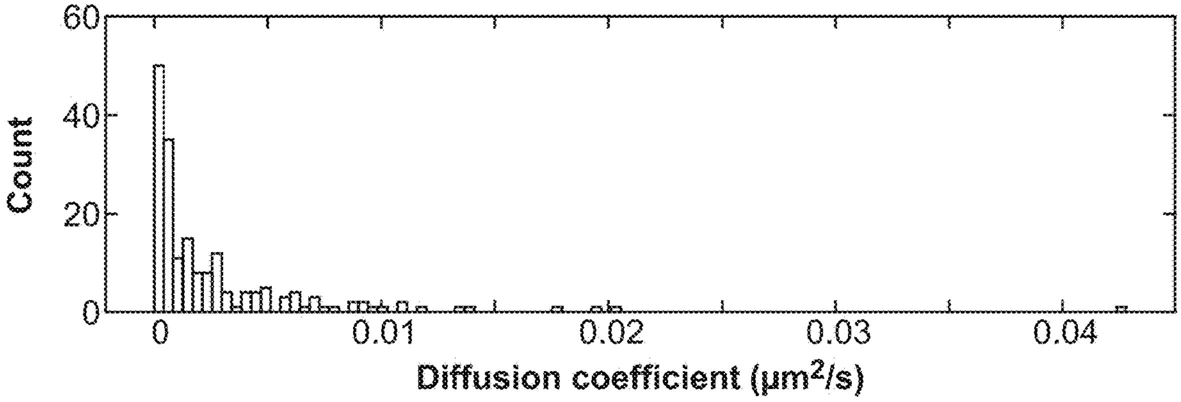
FIG. 13 is a histogram of estimated diffusion coefficients of all trajectories found in cell 1 and cell 2.
Figure 14:
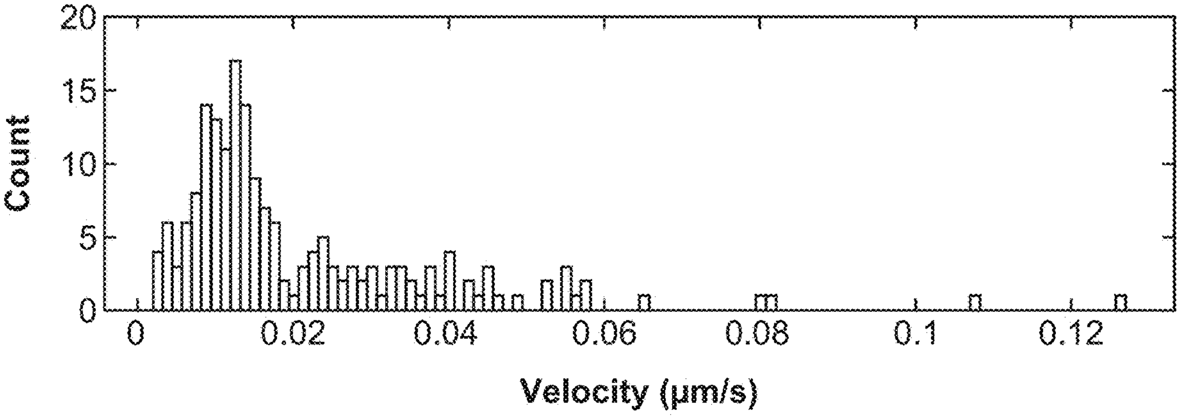
FIG. 14 is a histogram of estimated velocities of all trajectories found in cell 1 and cell 2.

The developed system for dual-color, volumetric imaging of live cells was applied and tracked the 3D motion of green fluorescent protein-labeled Fas ligand (GFP-FasL) loaded secretory granules in the cytosol of RBL-2H3 mast cells 37. IgE-bound FcεRI was simultaneously imaged by the addition of anti-DNP IgE-CF640R. With the addition of the antigen-mimic, DNP-conjugated to BSA (DNP-BSA), FcεRI aggregates and undergoes endocytosis as seen in FIG. 11. During data acquisition, the light sheet 16 was parallel to the XY plane and scanned along the Z direction. Within the light-sheet region, the XY and XZ maximum intensity projections (FIG. 11) of the cell image showed GFP-FasL granules in three dimensions. The cells were imaged at ~0.6 volumes (80×15×40 μm3 in XYZ) per second for 80 volumes, for a total imaging time of ~2 minutes (FIGS. 11-14). To quantify the granule dynamics, isolated granules were identified and tracked in 3D using the U-track3D software (https://github.com/DanuserLab/u-track3D). The mean square displacement (MSD) of each trajectory over time was calculated and the diffusion coefficient, D, and velocity, v, were extracted by fitting the MSD curve with MSD(t) =6Dt^2+v^2 t^2+o, where o is an offset related to localization and tracking uncertainties (FIGS. 13-14). As observed from this data, most granules undergo Brownian Diffusion and a few exhibited directed motion, consistent with granules being transported along the microtubules (FIGS. 11-12). The measured transport velocities of the two trajectories indicated in FIGS. 11-12 are ~0.1 μm/s, which is consistent with previous work that performed tracking in 2D.

To test the limits of the microscope 10 in terms of speed, Brownian motion on the microscopic level was measured.

Figure 15:
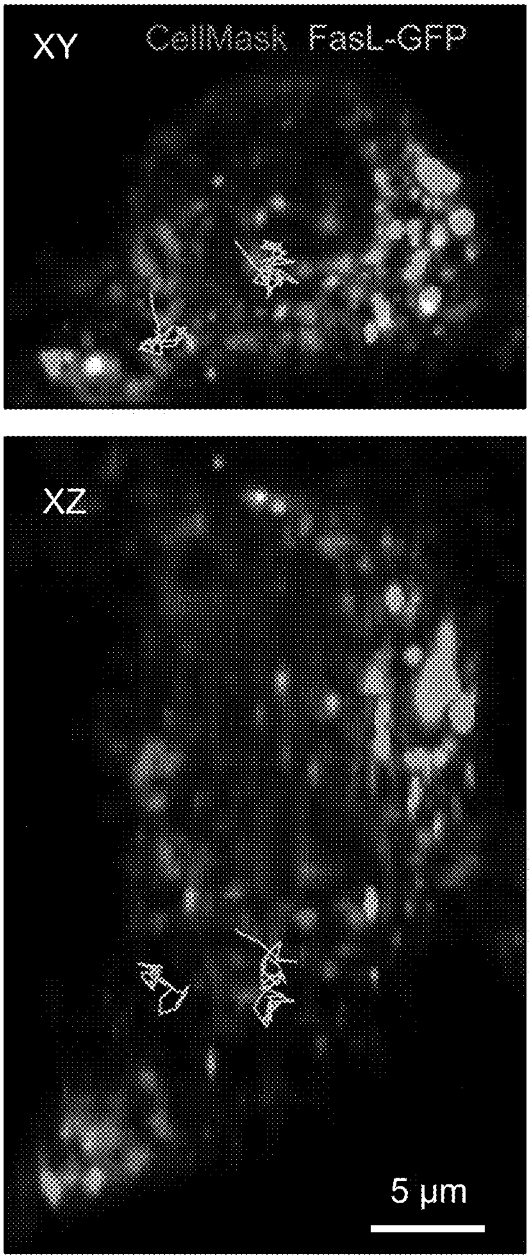
FIG. 15 are maximum intensity projection views of cell images at one-time point and overlay with representative trajectories of granule movement (orange lines).
Figure 16:
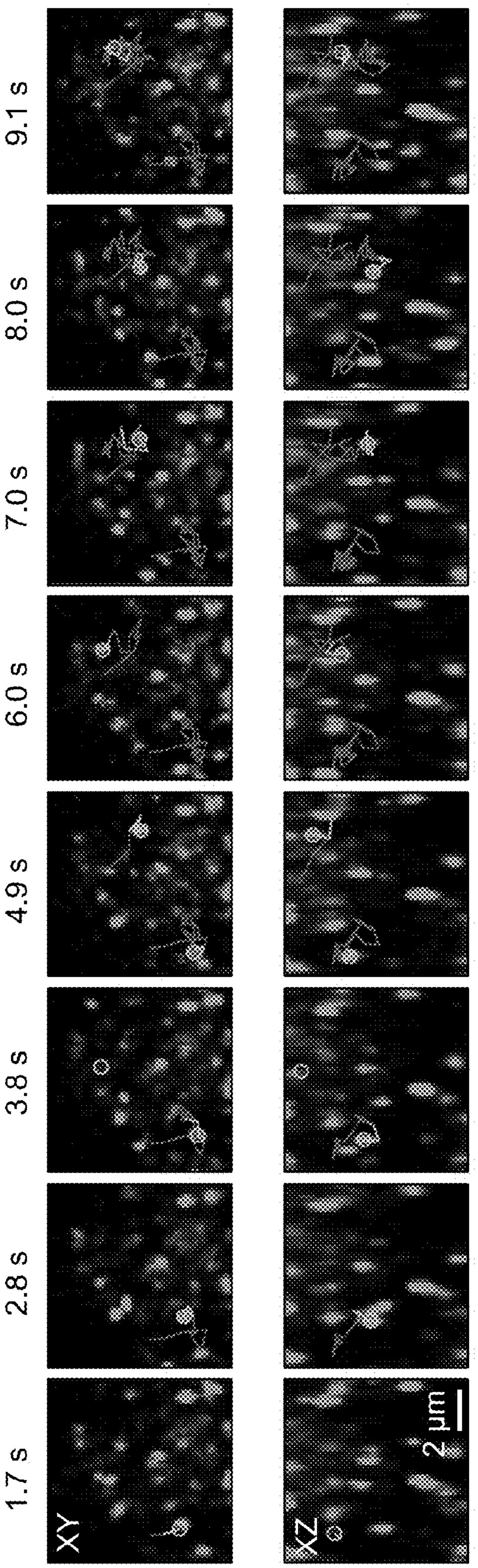
FIG. 16 are time series images of the trajectories of FIG. 15.
Figure 17:
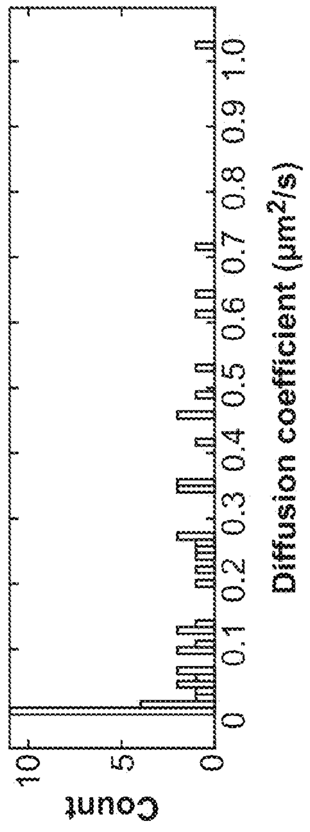
FIG. 17 is a histogram of estimated diffusion coefficients of all trajectories found in the cell.
Figure 18:
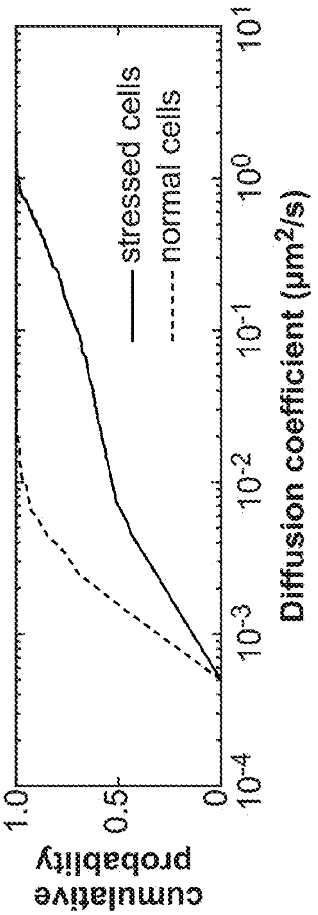
FIG. 18 is a graph of cumulative probability of the estimated diffusion coefficients under normal (FIGS. 11-14) and stressed (FIGS. 15-17) imaging conditions.

For this, the cells were stressed by incubating them in Hank's balanced salt solution (HBSS Method) at room temperature for over 1 hour, which induced cell blebbing. This also caused more rapid diffusion of the granules that was captured using an imaging speed of ~8.3 volumes/s for 80 volumes for a total time of 10 s. With this imaging speed, good signal-to-noise and the ability to track the 3D motion of individual granules was retained (FIGS. 15-17). Under these non-physiological conditions, average granule diffusion was increased by ~41 times (FIG. 18). Two tracks shown in FIG. 15 have diffusion coefficients of 0.41 micrometers squared per second and 0.64 micrometers squared per second.

Cell Samples

RBL-2H3 GFP-FasL cells were cultured in Gibco Minimum Essential Media (MEM) media supplemented with 10% heat-inactivated Fetal Bovine Serum (FBS), 1% Penicillin/Streptomycin, and 1% L-glutamine 37. The cells were primed with 1 microgram/milliliter anti-DNP-IgE55 (FIGS. 15-17) or anti-DNP-IgE-CF640R (FIGS. 15-18) and seeded at a density of 100,000 cells per well in 12 well dish over 5 millimeter glass coverslips and incubated with 5% CO^2 at 37 degrees C. overnight. IgE-CF640R was prepared using CF640R NHS-ester (Biotium #92108, available from Biotium Inc., Fremont, CA). For fast imaging experiments, the cellular membranes of anti-DNP-IgE primed cells were labeled with CellMask™ Deep Red Plasma Membrane Stain (Thermo Fisher Scientific #C10046, 5 mg/ml, 1000×, Waltham, Massachusetts) according to manufacturer's instruction for 10 minutes in modified Hank's balanced salt solution (HBSS) (additional 10 mM Hepes, 0.05% w/v BSA, 5.45 mM glucose, 0.88 mM MgSO4, 1.79 mM CaCl2, 16.67 mM NaHCO^3) and rinsed with HBSS. Cells were stimulated with 1 microgram/milliliter DNP-BSA in the sample chamber. Data was acquired in 2-minute captures for up to 15 minutes post antigen treatment.

Sample Mounting

Cell samples on 5 millimeter coverslips were loaded onto a sample holder. In the sample holder, two metal wires were designed to clamp the coverslip tightly. This sample holder was attached to the XYZ Translation Stage with Standard Micrometers using a rotation mount. As a result, the coverslip had four degrees of freedom, including the translation on the X-Y-Z axis to locate the cells while imaging and the rotation around the X-axis to face the coverslip with the desired angle relative to the illumination and detection objectives 42. Here, the coverslips were faced 8 degrees relative to the optic axis 6 of the detection objective. To minimize the buffer volume for live cell imaging, the 6 milliliter chamber was designed to immerse the sample, illumination, and detection objective lenses into it.

Image Processing Pipeline

Data were analyzed with the custom script written in MATLAB. The procedure for quantifying the microscope's resolution from fluorescence bead data is as follows:

1. A 3D-PSF model was generated from the raw data. PSF model was generated using the voxel-based PSF modeling method from uiPSF56. In this method, a 3D matrix representing the PSF model was extracted from multiple beads stacks using inverse modeling. For generating the light-sheet PSF model, a beads scan was collected by imaging beads in agarose gel at axial positions from −40 micrometers to 40 micrometers with a step size of 500 nanometers. Then beads within 5 micrometers around the light-sheet waist and 40 micrometers within the center of the scan range were selected for generating the PSF model.
2. The light-sheet region was cropped from each slice of the raw data. The FOV (length) of the light-sheet region was defined by the distance to the waist of the light-sheet where the axial resolution increases by 2 times. The light sheet FOV was set at ~8 micrometers. Note that the light-sheet region translated along its width direction (the Y-axis) while it was being scanned in the axial direction (Z-axis relative to the detection objective). As a result, the light-sheet region to be cropped was also shifted in Y accordingly.
3. The cropped region was deconvolved with the 3D-PSF model using Richard-Lucy deconvolution from ImageJ.
4. The deconvolved data stack was divided into segments with an axial dimension of 5 micrometers. For each segment, candidate beads were selected and their FWHMs along each dimension were estimated from Gaussian fitting of their intensity profiles along that dimension.
5. The measured FWHMs were used to quantify the resolution of the microscope as shown in FIG. 10.

Dual-color live-cell data was processed as follows:

1. Cell signal from each color channel was cropped with a user-selected region.
2. For each color channel, the XYZ drifts of the data stack at each time point relative to the reference data stack were estimated, where the maximum-intensity projection (MIP) along each dimension of the two data stacks was generated and the 2D shift between each pair of the MIP images was calculated through cross-correlation.
3. An average of the XYZ shifts from both channels was used to correct the drift between time points.
4. The XYZ shift between the two-color channels was calculated by first averaging over the time dimension for each color channel, then estimating the shift from the MIP images as in step 3. Then register the two channels by applying the estimated shift.
5. After drift correction and channel registration, the resulting image stacks were deconvolved with the 3D-PSF model generated from the bead data using Richard-Lucy deconvolution from Matlab.
6. To reduce noise and correct photobleaching, the deconvolved images were subtracted by a background value with negative pixel values set to zero and divided by a normalization factor equal to the 99.95 quantiles of all pixel values in the corresponding time points and color channel.

Quantification of Light-Sheet Dimension

To quantify the light-sheet dimension, bead data in agarose gel were collected at different slit widths. At each slit width, we estimated the FWHMs in XYZ for all selected beads as described above, however, here we used the full FOV of the color channel for bead imaging. As the position of the light-sheet waist shifted in y with respect to the axial dimension, the y coordinates of the selected bead was corrected by:

$$y'_{cor} = y_{cor} - az_{cor}$$

where a is the y shift by moving one pixel in Z. Then the $FWHM_2$ verse $y'_{cor}$ was fitted for all selected beads with a polynomial function. The length of the light sheet was found when the $FWHM_2$ was twice the minimum from the polynomial fit.

Magnification Calibration

One brightfield image of the calibration target was captured at each of the galvo positions from −40 to 40 micrometers with a step size of 10 micrometers. The target image consisted of parallel line segments, and a region of 700×700 pixels was cropped from each image. The affine transformation (from the Dipimage toolbox) of each image with respect to a reference image was calculated. The zoom factors from affine transformation were used to quantify the relative magnification between each image to the reference image. The absolute magnification of one image was calculated as follows: crop a narrow section of multiple parallel lines, obtain the intensity profile by averaging over the line dimension, smooth the intensity profile by applying a running average with a window size of 30 pixels, find all peaks from the smoothed intensity profile, calculate the average distance (in pixels, denoted as delta d) between consecutive peaks, as the distance between consecutive parallel lines is 10 millimeters, then the pixel size at the sample plane can be estimated from 10/(delta d) millimeters. The magnification can, therefore, be calculated from the pixel size of the camera divided by pixel size at the sample plane.

Ray Tracing

Ray tracing was based on geometric optics with paraxial approximation. The ray propagation was calculated using the ABCD matrices. Two matrices were used, the translation matrix, $$M_d = \begin{bmatrix} 1 & 0 \\ d/n & 1 \end{bmatrix},$$

and the matrix of a thin lens, $$M_f = \begin{bmatrix} 1 & -n/f \\ 0 & 1 \end{bmatrix},$$

where d is the translation distance, f is the focal length of the thin lens and n is the refractive index of the propagation medium. For this system, n is 1.33 before the detection objective 42 (including the objective) and n equals 1 for the rest of the ray tracing. The starting point of each ray was represented by a vector of $$[n\alpha, y]^T,$$

where a and y are the angle and the y position of the ray with respect to the optical axis. The propagation of the ray is then calculated from $$\begin{bmatrix} na' \\ y' \end{bmatrix} = M \begin{bmatrix} na \\ y' \end{bmatrix}.$$

For a defined FOV, three field points were selected, two mark the edge of the FOV and one at the optical axis. For each field point, three rays were generated at different angles that will intersect three points at the pupil plane, where two points mark the edge of the pupil and one at the center of the pupil. Rays from the same field point were colored the same. The optical axis after the polarizing beam splitter was rotated by 45 degree to be along the splitting plane of the PBS. The ray tracing after the PBS was done by first transforming the ray coordinates to the ones defined by the optical axis and propagating the ray with the ABCD matrix, then transforming back to the global coordinates. Except for the distance between the tube lens 72 and the detection objective 26, the rest distances between consecutive optical elements were measured with a ruler. The angle between the chief rays of the S and P-polarization (angle theta in FIG. 5) was set when the input and output beam diameters at the remote objective 42 were minimum. The distance $d_1$ was set when the relative magnifications from ray tracing match with the measured ones (FIG. 5). The central position of the scan range, the distance of the objective to the detection objective (denoted as $S_1$), was set when the absolute magnification from ray tracing matches with measured one. Here $S_1$=6.695 millimeters, which was 45 micrometers away from the designed focal plane of the detection objective.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A remote focusing system comprising:

a polarizing beam splitter configured to split an unpolarized light beam that is incident upon the beam splitter into a first polarized light beam comprising a first polarization and a second polarized light beam comprising a second polarization, wherein the first polarization is different from the second polarization, and further wherein the unpolarized light beam is representative of an image of a portion of a biological sample;

a remote objective configured to focus the first polarized light beam and the second polarized light beam onto a focal plane;

a first mirror configured to direct the first polarized light beam to the remote objective;

a second mirror configured to direct the second polarized light beam to the remote objective;

a focal plane mirror disposed at the focal plane of the remote objective and along an optical axis that extends orthogonally from a reflective surface of the focal plane mirror to the polarizing beam splitter, wherein the remote objective is further configured to provide a first polarized intermediate image of the portion of the sample based on the first polarized light beam on the reflective surface and a second polarized intermediate image of the portion of the sample based on the second polarized light beam on the reflective surface;

wherein the focal plane mirror is configured to direct a third polarized light beam comprising a third polarization and representative of the first polarized intermediate image to the first mirror and a fourth polarized light beam comprising a fourth polarization and representative of the second polarized intermediate image to the second mirror, wherein the third polarization is different from the fourth polarization;

wherein the first mirror is further configured to direct the third polarized light beam through the polarizing beam splitter to a detection surface of a detector, and further wherein the second mirror is further configured to direct the fourth polarized light beam through the polarizing beam splitter to the detection surface of the detector; and wherein the detector is configured to detect the first polarized intermediate image and the second polarized intermediate image as a final composite image.

2. The system of claim 1, further comprising a controller comprising one or more processors, wherein the controller is configured to manipulate the first mirror and the second mirror such that the first polarized intermediate image and the second polarized intermediate image are aligned at the detection surface of the detector to provide the final composite image.

3. The system of claim 2, wherein the controller is further configured to manipulate the focal plane mirror in a direction along the optical axis.

4. The system of claim 1, further comprising a quarter wave plate disposed between the polarizing beam splitter and the remote objective, wherein the quarter wave plate is configured to convert the first polarization of the first polarized light beam to a first circular polarization and the second polarization of the second polarized light beam to a second circular polarization different from the first circular polarization.

5. The system of claim 1, wherein the focal plane mirror is connected to an actuator that is configured to move the mirror along the optical axis.

6. The system of claim 1, further comprising a lens disposed between detector and the polarizing beam splitter and configured to focus the third polarized light beam and the fourth polarized light beam onto the detection surface of the detector.

7. The system of claim 1, wherein the detector comprises a camera.

8. The system of claim 1, wherein the first and third polarizations comprise s-polarized light and the second and fourth polarizations comprise p-polarized light.

9. The system of claim 1, wherein an angle theta formed between an axis of the first polarized light beam and an axis of the second polarized light beam at an incident surface of the objective is no greater than 10 degrees.

10. The system of claim 1, wherein the remote objective is in a fixed position relative to the polarizing beam splitter and the focal plane mirror.

11. The system of claim 1, wherein the first polarized intermediate image and the second polarized intermediate image are misaligned by a distance of no greater than 5 millimeters as measured along the reflective surface of the focal plane mirror.

12. A microscope comprising:

an illumination arm aligned along an illumination axis and comprising:

a light source configured to provide a light sheet that is projected through a biological sample; and an illumination objective configured to receive the light sheet from the light source and focus the light sheet through the sample; and a detection arm comprising a detection objective comprising an optical axis that is orthogonal to the illumination axis, wherein the detection objective is configured to receive light emitted by a portion of the sample that is illuminated with the light sheet and form an unpolarized light beam that is representative of an image of the portion of the sample, wherein the detection arm further comprises a remote focusing system comprising:

a polarizing beam splitter configured to split the unpolarized light beam that is incident upon the beam splitter from the detection objective into a first polarized light beam comprising a first polarization and a second polarized light beam comprising a second polarization, wherein the first polarization is different from the second polarization;

a remote objective configured to focus the first polarized light beam and the second polarized light beam onto a focal plane;

a first mirror configured to direct the first polarized light beam to the remote objective;

a second mirror configured to direct the second polarized light beam to the remote objective;

a focal plane mirror disposed at the focal plane of the remote objective and along an optical axis that extends orthogonally from a reflective surface of the mirror to the polarizing beam splitter, wherein the remote objective is further configured to provide a first polarized intermediate image of the portion of the sample based on the first polarized light beam on the reflective surface and a second polarized intermediate image of the portion of the sample based on the second polarized light beam on the reflective surface;

wherein the focal plane mirror is configured to direct a third polarized light beam comprising a third polarization and representative of the first polarized intermediate image to the first mirror and a fourth polarized light beam comprising a fourth polarization and representative of the second polarized intermediate image to the second mirror, wherein the third polarization is different from the fourth polarization;

wherein the first mirror is further configured to direct the third polarized light beam through the polarizing beam splitter to a detection surface of a detector, and further wherein the second mirror is further configured to direct the fourth polarized light beam through the polarizing beam splitter to the detection surface of the detector; and wherein the detector is configured to detect the first polarized intermediate image and the second polarized intermediate image as a final composite image.

13. The microscope of claim 12, further comprising a controller comprising one or more processors, wherein the controller is configured to manipulate the first mirror and the second mirror such that the first polarized intermediate image and the second polarized intermediate image are aligned at the detection surface of the detector to provide the final composite image.

14. The microscope of claim 13, wherein the controller is further configured to manipulate the focal plane mirror in a direction along the optical axis.

15. The microscope of claim 14, further comprising an illumination mirror configured to receive the light sheet from the light source and direct the light sheet to the illumination objective, wherein the controller is further configured to manipulate the illumination mirror to scan the sample with the light sheet.

16. The microscope of claim 15, wherein the controller is further configured to synchronously manipulate the illumination mirror and the focal plane mirror.

17. The microscope of claim 12, wherein the focal plane mirror is connected to an actuator that is configured to move the mirror along the optical axis.

18. A method comprising:

splitting an unpolarized light beam that is incident upon a beam splitter into a first polarized light beam comprising a first polarization and a second polarized light beam comprising a second polarization, wherein the first polarization is different from the second polarization, and further wherein the unpolarized light beam is representative of an image of a portion of a biological sample;

directing the first polarized light beam to a remote objective utilizing a first mirror;

directing the second polarized light beam to the remote objective utilizing a second mirror;

focusing the first polarized light beam to a reflective surface of a focal plane mirror utilizing the remote objective to provide a first polarized intermediate image of the portion of the sample;

focusing the second polarized light beam to the reflective surface of the focal plane mirror utilizing the remote objective to provide a second polarized intermediate image of the portion of the sample;

directing a third polarized light beam comprising a third polarization and representative of the first polarized intermediate image to the first mirror utilizing the focal plane mirror;

directing a fourth polarized light beam comprising a fourth polarization and representative of the second polarized intermediate image to the second mirror utilizing the focal plane mirror, wherein the third polarization is different from the fourth polarization;

directing the third polarized light beam through the polarizing beam splitter to a detection surface of a detector utilizing the first mirror;

directing the fourth polarized light beam through the polarizing beam splitter to the detection surface of the detector utilizing the second mirror; and detecting a final composite image of the portion of the biological sample utilizing the detector, wherein the final composite image comprises the first and second polarized intermediate images.

19. The method of claim 18, further comprising manipulating the first mirror and the second mirror such that the first polarized intermediate image and the second polarized intermediate image are aligned at the detection surface of the detector to provide the final composite image.

20. The method of claim 18, further comprising manipulating the focal plane mirror in a direction along an optical axis that extends orthogonally from a reflective surface of the mirror to the polarizing beam splitter.

* * * * *